(12) United States Patent
Baek et al.

(10) Patent No.: US 11,487,323 B2
(45) Date of Patent: Nov. 1, 2022

(54) ELECTRONIC DEVICE FOR ACQUIRING FINGERPRINT INFORMATION BY USING ULTRASONIC SIGNAL

(71) Applicant: Samsung Electronics Co., Ltd, Suwon-si (KR)

(72) Inventors: Seung Geol Baek, Suwon-si (KR); Moon Soo Kim, Seoul (KR); Jae Hyung Park, Suwon-si (KR); Chi Hyun Cho, Yongin-si (KR); Yun Jang Jin, Yongin-si (KR); Ho Chul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 592 days.

(21) Appl. No.: 16/477,492

(22) PCT Filed: Feb. 7, 2018

(86) PCT No.: PCT/KR2018/001646
§ 371 (c)(1),
(2) Date: Jul. 11, 2019

(87) PCT Pub. No.: WO2018/147632
PCT Pub. Date: Aug. 16, 2018

(65) Prior Publication Data
US 2019/0354738 A1  Nov. 21, 2019

(30) Foreign Application Priority Data
Feb. 7, 2017 (KR) .......................... 10-2017-0017023

(51) Int. Cl.
*G06F 1/16* (2006.01)
*B06B 1/02* (2006.01)
(Continued)

(52) U.S. Cl.
CPC .............. *G06F 1/163* (2013.01); *B06B 1/023* (2013.01); *B06B 1/06* (2013.01); *G06V 40/1306* (2022.01);
(Continued)

(58) Field of Classification Search
CPC .. G01N 2291/044; G01N 29/07; G01N 29/28; G01N 2291/0422; G01B 17/02;
(Continued)

(56) References Cited

U.S. PATENT DOCUMENTS 9,323,393 B2 * 4/2016 Djordjev ............... G06F 3/0421
9,424,456 B1 * 8/2016 Kamath Koteshwara ...................
G06V 40/1306
(Continued)

FOREIGN PATENT DOCUMENTS

KR  10-2010-0127432 A  12/2010
KR  10-2016-0130234 A  11/2016
(Continued)

OTHER PUBLICATIONS

International Search Report dated May 23, 2018 in connection with International Patent Application No. PCT/KR2018/001646, 2 pages.

*Primary Examiner* — Clayton E. LaBalle
*Assistant Examiner* — Kevin C Butler

(57) ABSTRACT

Disclosed is an electronic device. The electronic device according to an embodiment may include an ultrasonic sensor and a processor electrically connected to the ultrasonic sensor. The processor may be configured to obtain a noise signal at a periphery of the electronic device, via the ultrasonic sensor, to determine an attribute of a first ultrasonic signal oscillated by the ultrasonic sensor, based on the obtained noise signal, and to obtain fingerprint information based on the second ultrasonic signal obtained via the ultrasonic sensor and the determined attribute. Moreover, (Continued)

various embodiment found through the disclosure are possible.

14 Claims, 29 Drawing Sheets

(51) Int. Cl.
| | |
|---|---|
| *B06B 1/06* | (2006.01) |
| *G06V 40/13* | (2022.01) |
| *G06F 3/0484* | (2022.01) |
| *G06F 3/044* | (2006.01) |
| *G01B 17/02* | (2006.01) |
| *G01N 29/07* | (2006.01) |
| *G01N 29/28* | (2006.01) |

(52) U.S. Cl.
CPC .......... *B06B 2201/70* (2013.01); *G01B 17/02* (2013.01); *G01N 29/07* (2013.01); *G01N 29/28* (2013.01); *G01N 2291/044* (2013.01); *G01N 2291/0422* (2013.01); *G06F 3/044* (2013.01); *G06F 3/0484* (2013.01)

(58) Field of Classification Search
CPC ........ G06F 1/163; G06F 3/044; G06F 3/0484; G06V 40/1306; B06B 1/023; B06B 1/06; B06B 2201/70

USPC .......................................................... 73/629
See application file for complete search history.

(56) References Cited

U.S. PATENT DOCUMENTS

| | | | |
|---|---|---|---|
| 9,815,087 B2* | 11/2017 | Ganti | G06F 3/0412 |
| 10,254,901 B2* | 4/2019 | Dickinson | G06F 3/0416 |
| 2010/0303311 A1* | 12/2010 | Shin | G06V 10/993 |
| | | | 382/124 |
| 2014/0079300 A1* | 3/2014 | Wolfer | G06V 40/67 |
| | | | 382/124 |
| 2015/0198699 A1* | 7/2015 | Kuo | G01S 15/02 |
| | | | 367/7 |
| 2016/0042217 A1* | 2/2016 | Kim | G06V 40/1306 |
| | | | 382/124 |
| 2018/0300571 A1* | 10/2018 | Che | G06V 10/255 |

FOREIGN PATENT DOCUMENTS

| | | | |
|---|---|---|---|
| KR | 20160130234 A | * 11/2016 | G06K 9/00 |
| WO | 2015/134816 A1 | 9/2015 | |
| WO | WO-2015134816 A1 | * 9/2015 | G01S 15/8952 |

* cited by examiner

ELECTRONIC DEVICE FOR ACQUIRING FINGERPRINT INFORMATION BY USING ULTRASONIC SIGNAL

CROSS-REFERENCE TO RELATED APPLICATIONS

This application is a 371 of International Application No. PCT/KR2018/001646 filed on Feb. 7, 2018, which claims priority to Korean Patent Application No. 10-2017-0017023 filed on Feb. 7, 2017, the disclosures of which are herein incorporated by reference in their entirety.

BACKGROUND

1. Field

The disclosure relates to a technology that obtains fingerprint information by using an ultrasonic signal.

2. Description of Related Art

As the security of an electronic device becomes important, the fingerprint that is biometric information of a user has been used for the security of the electronic device. The fingerprint recognition method includes an optical method, an electrostatic method, and an ultrasonic method.

In recent years, a fingerprint sensor that recognizes the fingerprint on the display surface of the electronic device has been developed, and the ultrasonic method has been used as a fingerprint recognition method of the fingerprint sensor of this structure.

A fingerprint sensor of an ultrasonic method has the advantage of recognizing a fingerprint in a wide area. However, when an ultrasonic frequency band similar to the ultrasonic frequency used by an electronic device is used, the corresponding frequency may interfere with the frequency used by the electronic device.

To solve the above-described issue, in the disclosure, an electronic device that identifies the surrounding ultrasonic signal by using the ultrasonic sensor of the electronic device and then changes the attribute of the oscillated ultrasonic wave to obtain accurate fingerprint information is provided.

SUMMARY

An electronic device according to an embodiment disclosed in the disclosure may include an ultrasonic sensor and a processor electrically connected to the ultrasonic sensor. The processor may be configured to obtain a noise signal at a periphery of the electronic device, via the ultrasonic sensor, to determine an attribute of a first ultrasonic signal oscillated by the ultrasonic sensor, based on the obtained noise signal, and to obtain fingerprint information based on the second ultrasonic signal obtained via the ultrasonic sensor and the determined attribute.

Moreover, an electronic device according to an embodiment disclosed in the disclosure may include a display, an ultrasonic sensor positioned on a rear surface of the display and obtaining an ultrasonic signal in at least a partial area of the display and a processor electrically connected to the display and the ultrasonic sensor. The processor may be configured to oscillate a first ultrasonic signal via the ultrasonic sensor, to obtain a second ultrasonic signal corresponding to the first ultrasonic signal via the ultrasonic sensor, to determine an attribute of a third ultrasonic signal oscillated by the ultrasonic sensor, based on the obtained second ultrasonic signal, to oscillate the third ultrasonic signal via the ultrasonic sensor, and to obtain fingerprint information via the ultrasonic sensor based on a fourth ultrasonic signal corresponding to the third ultrasonic signal and the determined attribute.

Moreover, a computer-readable recording medium according to an embodiment disclosed in the disclosure may store instructions. When executed by a processor of an electronic device, the instructions may cause the electronic device to perform obtaining a first signal via an ultrasonic sensor, determining an attribute of an ultrasonic signal oscillated by the ultrasonic sensor, based on the obtained first signal, oscillating an ultrasonic signal having the determined attribute via the ultrasonic sensor, obtaining a second signal via the ultrasonic sensor, and obtaining fingerprint information based on the second signal.

According to embodiments disclosed in the disclosure, it may be possible to obtain more accurate fingerprint information of a user by reducing the influence of surrounding ultrasonic waves.

Besides, a variety of effects directly or indirectly understood through this disclosure may be provided.

DETAILED DESCRIPTION

Figure 1A:
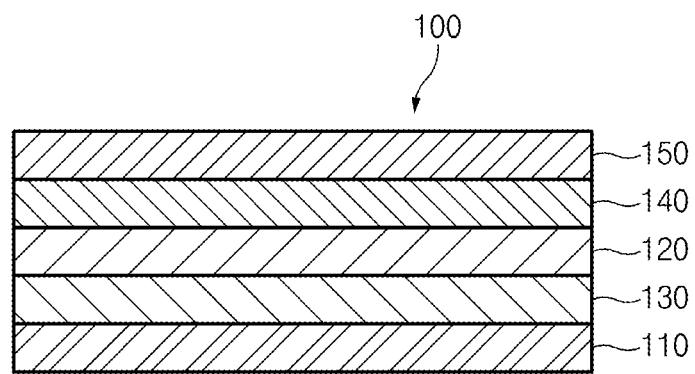
FIGS. 1A to 1D are sectional views of electronic device including an ultrasonic sensor, according to various embodiments of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

First of all, a method of obtaining a signal such that an ultrasonic sensor of an electronic device according to an embodiment of the disclosure obtains fingerprint information of a user contacting a screen glass will be described with reference to FIGS. 1A to 1D.

FIGS. 1A to 1D are sectional views of electronic device including an ultrasonic sensor, according to various embodiments of the disclosure.

Referring to FIGS. 1A to 1D, an electronic device 100 may include a first ultrasonic sensor 110, a second ultrasonic sensor 120, a display 130, a touch screen panel 140, a screen glass 150, and the like.

The first ultrasonic sensor 110 and the second ultrasonic sensor 120 may include an oscillation unit oscillating an ultrasonic signal and a receiving unit obtaining the ultrasonic signal of a specific band. For example, the oscillation unit may oscillate the ultrasonic signal corresponding to 100 kHz to 100 MHz. The receiving unit may receive an ultrasonic signal transmitted from the outside of an ultrasonic sensor and may receive the ultrasonic signal oscillated by the oscillation unit. In an embodiment, the oscillation unit and the receiving unit may include piezoelectric.

In an embodiment, the first ultrasonic sensor 110 and the second ultrasonic sensor 120 may include only one of the oscillation unit and the receiving unit.

In the embodiment of FIG. 1A, the first ultrasonic sensor 110 may include the oscillation unit, and the second ultrasonic sensor 120 may include the receiving unit. The ultrasonic signal oscillated by the first ultrasonic sensor 110 may be transmitted to a user's fingerprint through the display 130, the second ultrasonic sensor 120, the touch screen panel 140, and the screen glass 150, each of which is a medium. The transmitted ultrasonic signal is reflected on the user's fingerprint, and then the reflected ultrasonic signal may be transmitted to the second ultrasonic sensor 120 through the screen glass 150 and the touch screen panel 140, each of which is a medium. The second ultrasonic sensor 120 may obtain a signal, using the reflected ultrasonic signal.

Figure 1B:
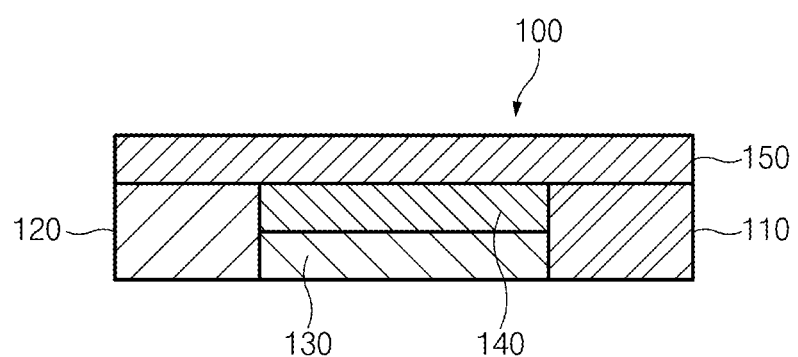

In the embodiment of FIG. 1B, the first ultrasonic sensor 110 may include an oscillation unit, and the second ultrasonic sensor 120 may include a receiving unit. The oscillation unit of the first ultrasonic sensor 110 may oscillate the screen glass 150 positioned above the first ultrasonic sensor 110, to oscillate an ultrasonic signal. The oscillated ultrasonic signal may be reflected on the user's fingerprint contacting the screen glass 150 positioned above the second ultrasonic sensor 120 and then may be transmitted to the second ultrasonic sensor 120. The second ultrasonic sensor 120 may obtain a signal, using the reflected ultrasonic signal.

Figure 1C:
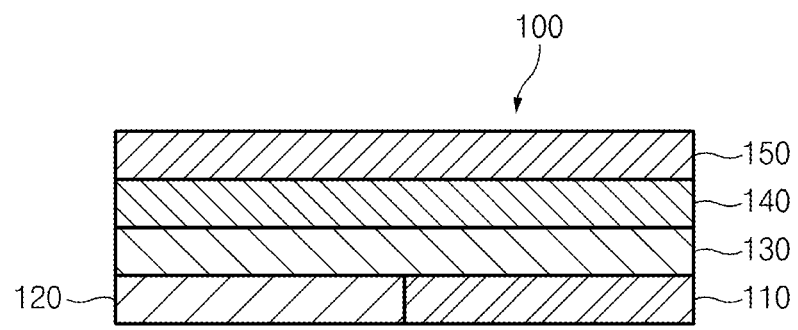

In the embodiment of FIG. 1C, the first ultrasonic sensor 110 and the second ultrasonic sensor 120 may include both the oscillation unit and the receiving unit. For the purpose of obtaining fingerprint information of the user contacting the screen glass 150 above the first ultrasonic sensor 110, the first ultrasonic sensor 110 may oscillate the ultrasonic signal and then may obtain the reflected ultrasonic signal to obtain a signal. For the purpose of obtaining fingerprint information of the user contacting the screen glass 150 above the second ultrasonic sensor 120, the second ultrasonic sensor 120 may oscillate the ultrasonic signal and then may obtain the reflected ultrasonic signal to obtain a signal.

Figure 1D:
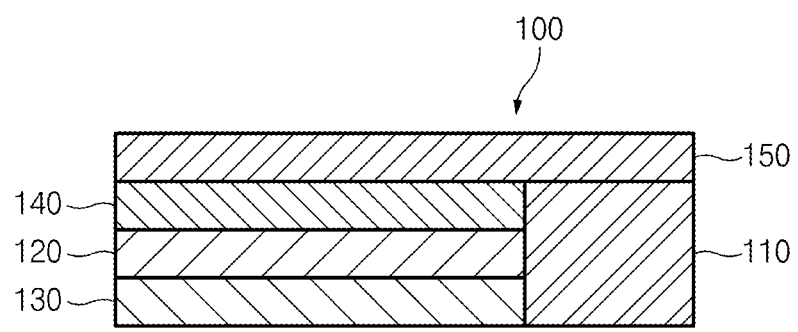

In the embodiment of FIG. 1D, the first ultrasonic sensor 110 may include an oscillation unit, and the second ultrasonic sensor 120 may include a receiving unit. The oscillation unit of the first ultrasonic sensor 110 may oscillate the screen glass 150 positioned above the first ultrasonic sensor 110, to oscillate an ultrasonic signal. The oscillated ultrasonic signal may be reflected by the user's fingerprint contacting the screen glass 150 positioned above the second ultrasonic sensor 120 and then may be transmitted to the second ultrasonic sensor 120. The second ultrasonic sensor 120 may obtain a signal, using the reflected ultrasonic signal.

Figure 2:
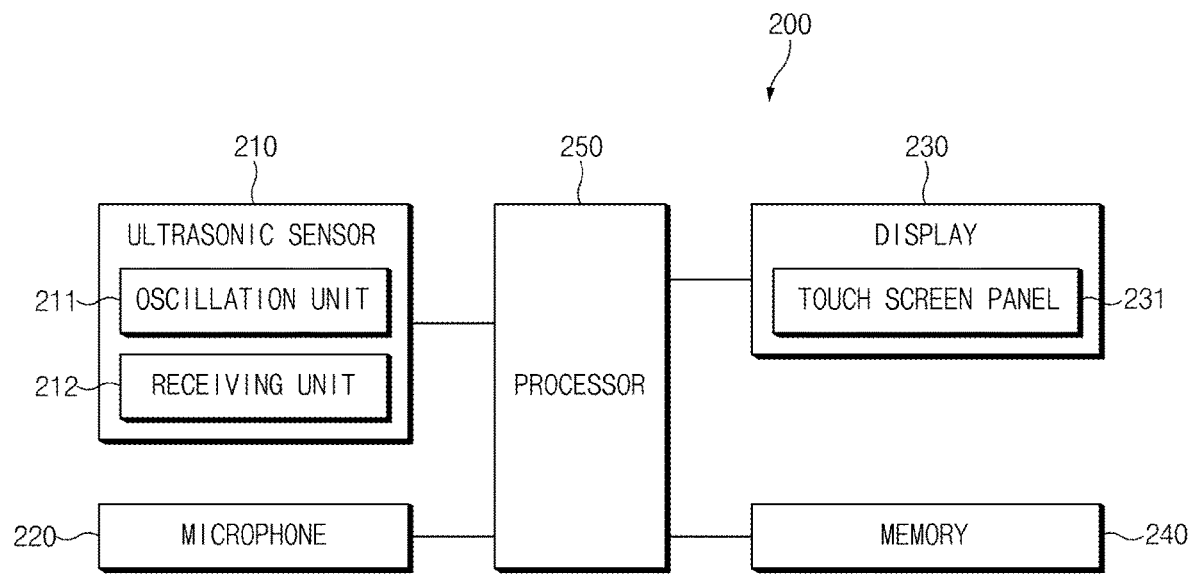
FIG. 2 is a block diagram of an electronic device, according to an embodiment of the disclosure.

FIG. 2 is a block diagram of an electronic device, according to an embodiment of the disclosure.

Referring to FIG. 2, an electronic device 200 may include an ultrasonic sensor 210, a microphone 220, a display 230, a memory 240, and a processor 250. In various embodiments, the electronic device 200 may omit a part of the above-mentioned components or may further include other components. For example, the microphone 220 may be omitted, and a temperature sensor (not illustrated) may be additionally included in the electronic device 200.

The ultrasonic sensor 210 may include an oscillation unit 211 oscillating an ultrasonic signal and a receiving unit 212 obtaining the ultrasonic signal. The ultrasonic sensor 210 of FIG. 2 may correspond to the first ultrasonic sensor 110 or the second ultrasonic sensor 120 of FIGS. 1A to 1D.

The microphone 220 may obtain not only an audible sound wave but also an ultrasonic signal. The microphone 220 may transmit the obtained ultrasonic signal to the processor 250.

The display 230 may display a user interface (UI) associated with ultrasonic fingerprint authentication. For example, when the ultrasonic fingerprint authentication is difficult depending on a surrounding environment, the display 230 may display the UI associated therewith. The display 230 of FIG. 2 may correspond to the display 130 of FIGS. 1A to 1D.

In an embodiment, the display 230 may include a touch screen panel 231. In this case, a user may generate a user input by touching the display 230. In other words, when the display 230 is integrally implemented with the touch screen panel 231, it is understood that the display 230 performs the functions of an input device and an output device together. The touch screen panel 231 of FIG. 2 may correspond to the touch screen panel 140 of FIGS. 1A to 1D.

The memory 240 may include a volatile and/or nonvolatile memory. The memory 240 may store a command or data associated with an element of the electronic device 200. For example, the memory 240 may store an algorithm associated with the ultrasonic fingerprint authentication and fingerprint information of the user.

The processor 250 may control other components electrically connected to the processor 250 in the electronic device 200 and may perform calculation. For example, the processor 250 may correspond to the application processor (AP) of the electronic device 200. An operation of the processor 250 will be more fully described below.

Hereinafter, a method of obtaining fingerprint information based on the signal obtained through an ultrasonic sensor will be described with reference to FIGS. 3 to 12.

Figure 3:
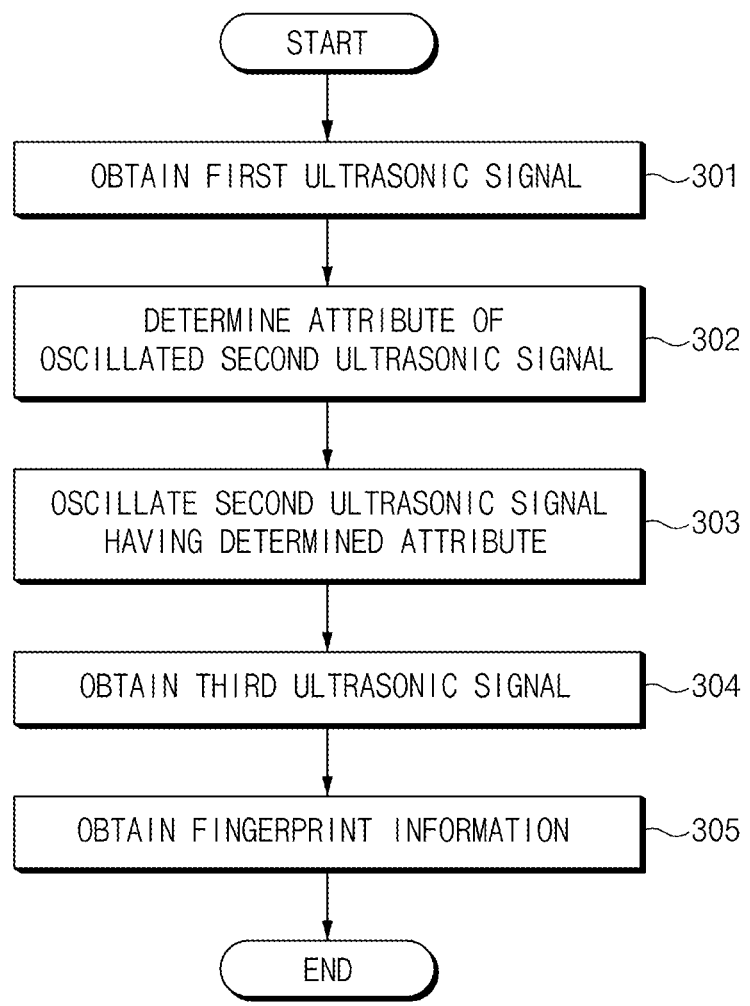
FIG. 3 is a flowchart illustrating a procedure in which an electronic device obtains fingerprint information, according to an embodiment of the disclosure.

FIG. 3 is a flowchart illustrating a procedure in which an electronic device obtains fingerprint information, according to an embodiment of the disclosure.

In operation 301, the processor 250 may obtain a first ultrasonic signal through the ultrasonic sensor 210. The ultrasonic sensor 210 may obtain the first ultrasonic signal to transmit the obtained first ultrasonic signal to the processor 250; the first ultrasonic signal may include at least one of an oscillation ultrasonic signal (or an ultrasonic signal oscillated by the ultrasonic sensor 210 of the electronic device) returned after being reflected from an object (e.g., a user's fingerprint, or the like) or a noise signal generated from the outside of the electronic device In an embodiment, the processor 250 may obtain a first ultrasonic signal further using the microphone 220.

In operation 302, the processor 250 may determine the attribute of a second ultrasonic signal oscillated by the ultrasonic sensor 210, using the first ultrasonic signal. In an embodiment, the processor 250 may determine at least one of the strength of the second ultrasonic signal, the frequency of the second ultrasonic signal, or the cycle at which the second ultrasonic signal is oscillated, based on the first ultrasonic signal.

In operation 303, the ultrasonic sensor 210 may oscillate the second ultrasonic signal having the determined attribute. For example, the ultrasonic sensor 210 may oscillate the second ultrasonic signal having the frequency and strength, which is determined by the processor 250 in operation 302.

In operation 304, the processor 250 may obtain a third ultrasonic signal through the ultrasonic sensor 210. The ultrasonic sensor 210 may obtain the third ultrasonic signal to transmit the third ultrasonic signal to the processor 250. Herein, the third ultrasonic signal obtained by the ultrasonic sensor 210 may be a signal obtained by the reflection of the second ultrasonic signal oscillated by the second ultrasonic sensor 210 on an object (e.g., the fingerprint of a user contacting the screen glass 150).

In operation 305, the processor 250 may obtain fingerprint information based on the third ultrasonic signal and the attribute of the second ultrasonic signal. The oscillated second ultrasonic signal may be reflected by the user's fingerprint, and the ultrasonic signal may be differently reflected depending on the difference between a portion where the user touches the display 230 in the user's fingerprint and a portion where the user does not touch the display 230 in the user's fingerprint. The ultrasonic sensor 210 may obtain the reflected third ultrasonic signal, and then the processor 250 may obtain fingerprint information based on the obtained third ultrasonic signal and the attribute of the second ultrasonic signal.

In an embodiment, the processor 250 may obtain fingerprint information based on the third signal corresponding to the attribute of the second ultrasonic signal oscillated in operation 303. For example, when the frequency of the second ultrasonic signal oscillated in operation 303 is 5 MHz, the processor 250 may obtain fingerprint information based on the third ultrasonic signal corresponding to the second ultrasonic signal, the frequency of which is 5 MHz.

The processor 250 may further perform fingerprint authentication, using an algorithm associated with the fingerprint authentication and fingerprint information of the user stored in the memory 240 by using the obtained fingerprint information.

Hereinafter, the specific embodiment of FIG. 3 will be described with reference to FIGS. 4 to 7B, and FIGS. 8 to 12.

Figure 4:
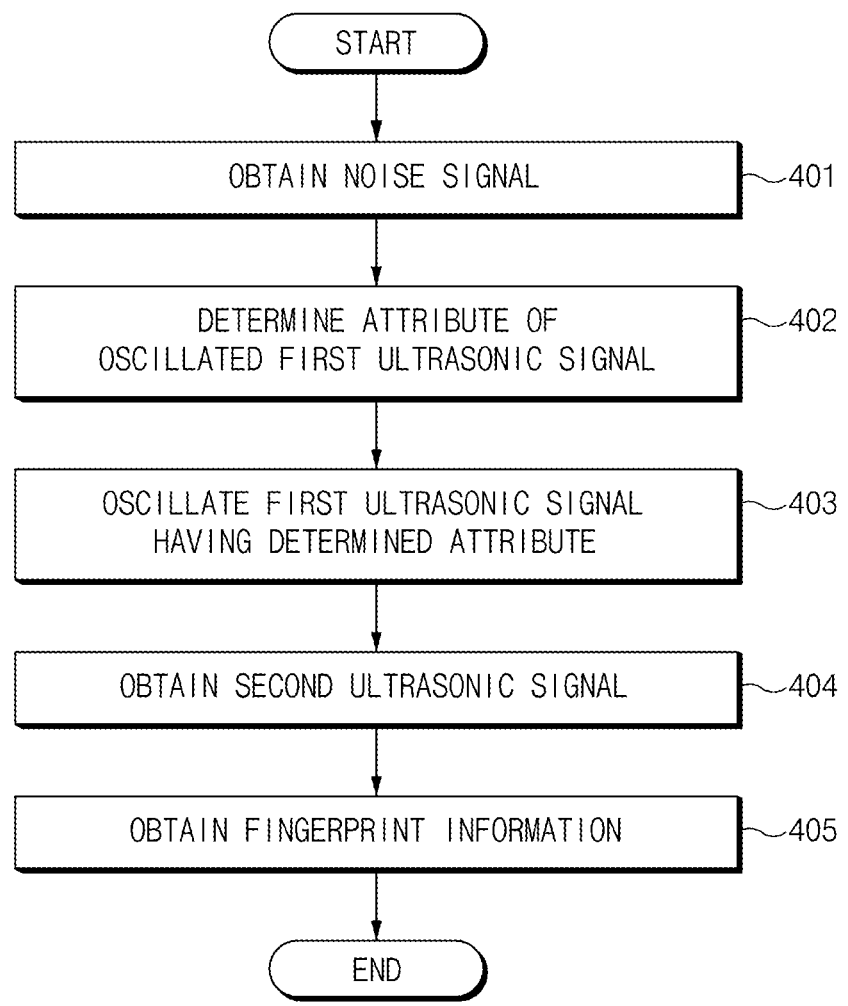
FIG. 4 is a flowchart illustrating a procedure in which an electronic device obtains fingerprint information based on a noise signal, according to an embodiment of the disclosure.

FIG. 4 is a flowchart illustrating a procedure in which an electronic device obtains fingerprint information based on a noise signal, according to an embodiment of the disclosure.

Operation 401 to operation 405 may correspond to operation 301 to operation 305 in FIG. 3.

In operation 401, the processor 250 may obtain a noise signal through the ultrasonic sensor 210. The ultrasonic sensor 210 may obtain an ultrasonic signal generated from the outside of an electronic device. Because the obtained ultrasonic signal is an ultrasonic signal obtained before the ultrasonic sensor 210 of the electronic device oscillates an ultrasonic signal and is not associated with fingerprint information of a user, the obtained ultrasonic signal may correspond to a noise signal.

In an embodiment, the processor 250 may obtain the noise signal through the microphone 220. The microphone 220 may obtain not only a sound wave signal corresponding to an audible frequency range but also an ultrasonic signal. Because the ultrasonic signal obtained by the microphone 220 is the signal obtained before the ultrasonic sensor 210 oscillates an ultrasonic signal, the ultrasonic signal may correspond to a noise signal. In operation 402, the processor 250 may determine the attribute of the first ultrasonic signal oscillated by the ultrasonic sensor 210, based on the noise signal. For example, the processor 250 may determine at least one of the strength of a first ultrasonic signal oscillated by the ultrasonic sensor 210 based on the noise signal, the cycle at which the first ultrasonic signal is oscillated, or the frequency of the first ultrasonic signal.

In operation 403, the ultrasonic sensor 210 may oscillate the first ultrasonic signal having the determined attribute. For example, the ultrasonic sensor 210 may oscillate the first ultrasonic signal according to the strength, frequency, or oscillation cycle, which is determined by the processor 250 in operation 402.

In operation 404, the processor 250 may obtain a second ultrasonic signal through the ultrasonic sensor 210. The ultrasonic sensor 210 may obtain the second ultrasonic signal to transmit the second ultrasonic signal to the processor 250. Herein, the second ultrasonic signal obtained by the ultrasonic sensor 210 may be a signal obtained by the reflection of the first ultrasonic signal, which is oscillated by the ultrasonic sensor 210 in operation 403, on an object.

In operation 405, the processor 250 may obtain fingerprint information based on the obtained second ultrasonic signal and the attribute of the first ultrasonic signal.

Figure 5A:
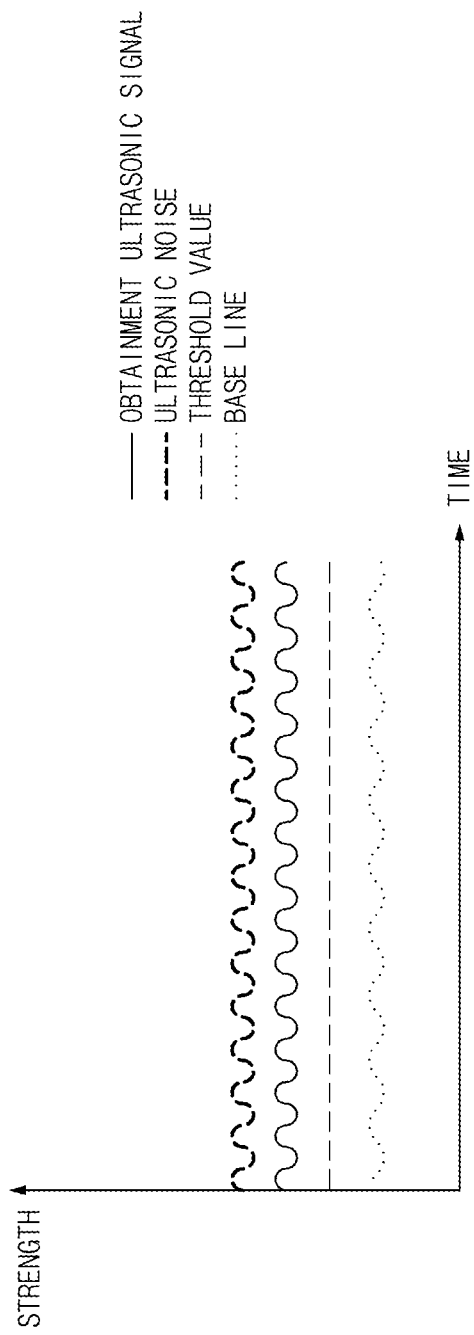
FIG. 5A is a graph illustrating strength of each of a noise signal and an obtainment ultrasonic signal, when an obtainment ultrasonic signal according to an embodiment of the disclosure is less than a noise signal.
Figure 5B:
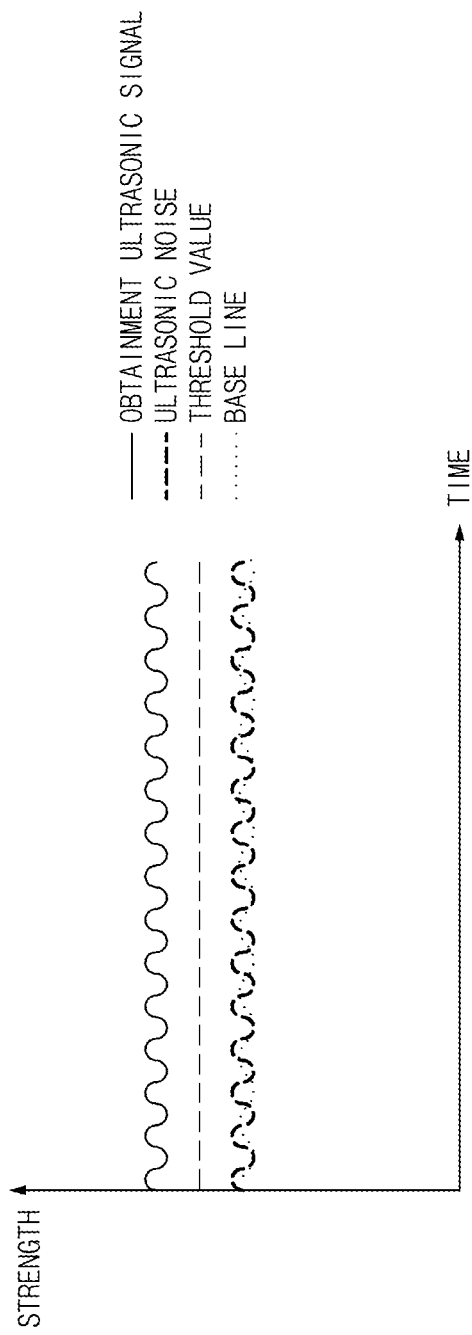
FIG. 5B is a graph illustrating strength of each of a noise signal and an obtainment ultrasonic signal, when an obtainment ultrasonic signal according to an embodiment of the disclosure is greater than a noise signal.

FIG. 5A is a graph illustrating strength of each of a noise signal and an obtainment ultrasonic signal, when an obtainment ultrasonic signal according to an embodiment of the disclosure is less than a noise signal. FIG. 5B is a graph illustrating strength of each of a noise signal and an obtainment ultrasonic signal, when an obtainment ultrasonic signal according to an embodiment of the disclosure is greater than a noise signal.

In an embodiment, the obtainment ultrasonic signal illustrated in FIG. 5A may be the ultrasonic signal obtained by the ultrasonic sensor 210 after the oscillated ultrasonic signal is reflected on an object, as a signal corresponding to an ultrasonic signal oscillated by the ultrasonic sensor 210 depending on the preset attribute. Referring to FIG. 5A, the strength of the ultrasonic signal obtained by the ultrasonic sensor 210 is less than the strength of the noise signal. Because the threshold value is also less than the strength of the noise signal, the processor 250 may use the noise signal as a valid ultrasonic signal, when obtaining fingerprint information.

In operation 402, the processor 250 may determine the strength of the first ultrasonic signal oscillated by the ultrasonic sensor 210 such that the obtainment ultrasonic signal is greater than the noise signal.

According to an embodiment, as illustrated in FIG. 5B, the processor 250 may determine the strength of the first ultrasonic signal oscillated by the ultrasonic sensor 210 such that the obtainment ultrasonic signal is greater than the noise signal. For example, the ultrasonic sensor 210 may oscillate an ultrasonic signal of the preset strength and then may obtain the reflected ultrasonic signal. When the strength of the obtained ultrasonic signal is less than the strength of the noise signal, the processor 250 may determine the strength of the first ultrasonic signal oscillated by the ultrasonic sensor 210 such that the strength of the first ultrasonic signal becomes a value obtained by adding the preset strength to the strength of the noise signal.

In operation 403, the ultrasonic sensor 210 may oscillate the first ultrasonic signal of the determined strength, and in operation 404, the processor 250 may obtain the second ultrasonic signal having strength greater than the strength of the noise signal, via the ultrasonic sensor 210.

The magnitude of the second ultrasonic signal may be greater than a threshold value, and the processor 250 may obtain fingerprint information based on the second ultrasonic signal.

In an embodiment, even though the strength of the second ultrasonic signal obtained by the processor 250 is greater than the strength of a noise signal, when a threshold value that is a standard for determining a valid signal is less than the strength of the noise signal, the processor 250 may use the noise signal as a valid signal. The processor 250 may set a new threshold value based on the strength of the first ultrasonic signal determined in operation 402 and may obtain fingerprint information based on the set threshold value and the obtained second ultrasonic signal in operation 405. For example, the processor 250 may set the threshold value such that the new threshold value becomes a value obtained by adding the existing threshold value to the strength of the noise signal. Then, as illustrated in FIG. 5B, the threshold value may be greater than the strength of the noise signal and may be less than that of the second ultrasonic signal. Accordingly, the processor 250 may obtain fingerprint information by using only the second ultrasonic signal greater than the threshold value, as a valid signal.

According to an embodiment, in operation 405, the processor 250 may adjust a base line. The base line may indicate a value corresponding to the preset strength of the noise signal, and the processor 250 may determine that a signal having strength within a preset range is the noise signal, based on the strength of the base line value. Referring to FIG. 5A, because the strength of the noise signal is not within the preset range based on the strength of the base line value, the processor 250 may not determine that the received noise signal is the noise signal.

As illustrated in FIG. 5B, the processor 250 may adjust the value of the base line such that the value of the base line approaches the strength value of the noise signal, based on the strength of the noise signal obtained in operation 401. As the base line is adjusted, because the strength of the noise signal is within the preset range based on the strength of the value of the base line, the processor 250 may determine that the received noise signal is the noise signal and may obtain fingerprint information, using a signal other than the noise signal among ultrasonic signals obtained by the ultrasonic sensor 210, as a valid signal.

Figure 6A:
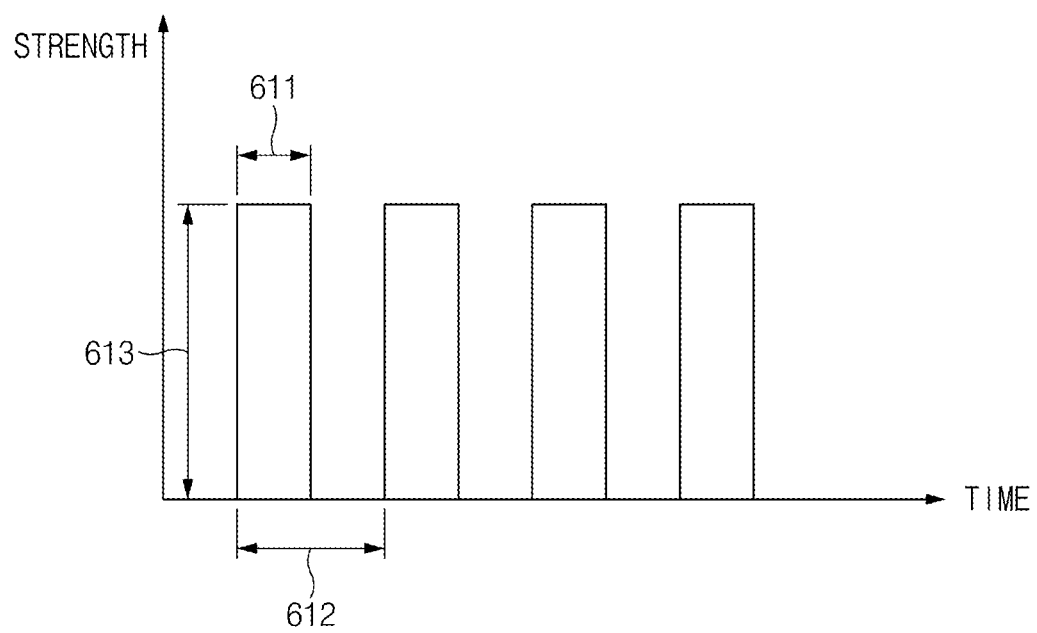
FIG. 6A is a graph illustrating a square wave pulse, according to an embodiment of the disclosure.
Figure 6B:
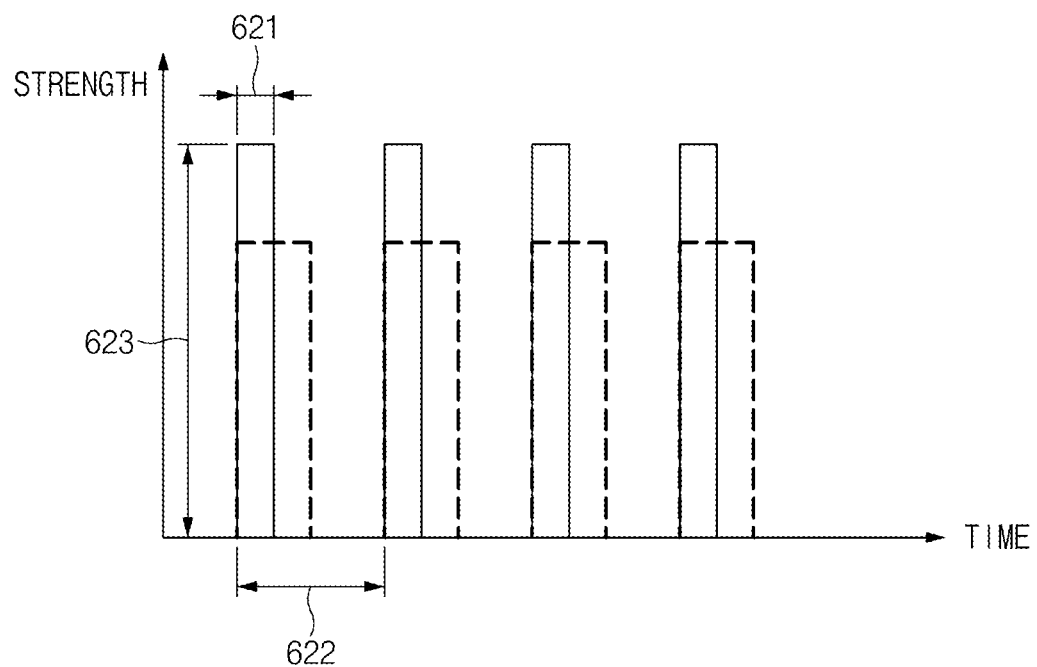
FIG. 6B is a graph illustrating a square wave pulse, the amplitude of which increases and the width of which decreases, according to an embodiment of the disclosure.
Figure 6C:
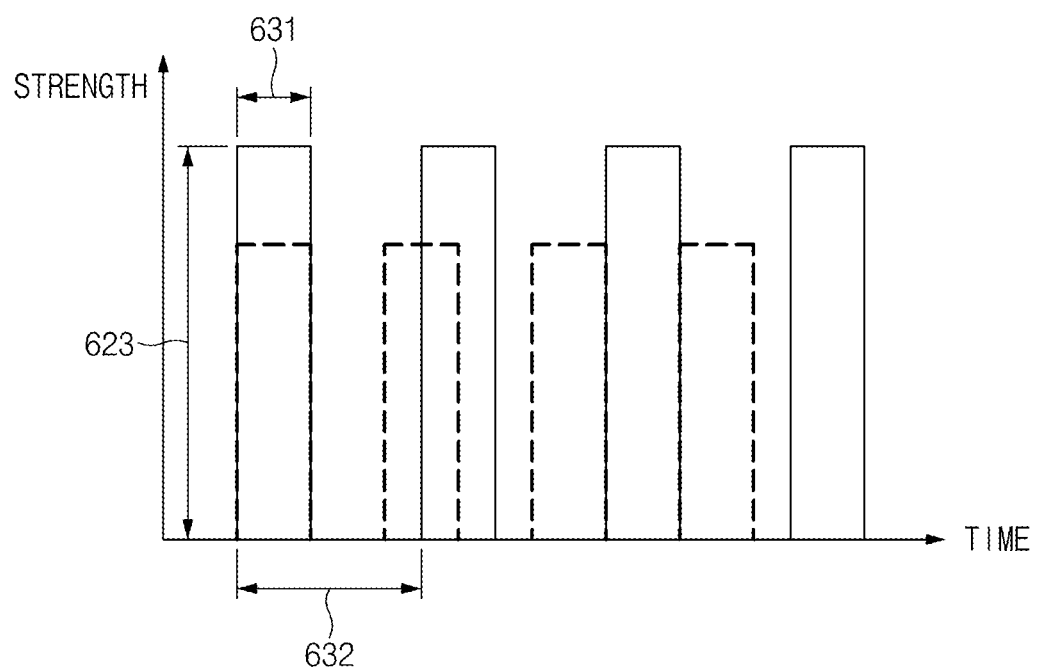
FIG. 6C is a graph illustrating a square wave pulse, the amplitude and cycle of which increases, according to an embodiment of the disclosure.

FIG. 6A is a graph illustrating a square wave pulse, according to an embodiment of the disclosure. FIG. 6B is a graph illustrating a square wave pulse, the amplitude of which increases and the width of which decreases, according to an embodiment of the disclosure. FIG. 6C is a graph illustrating a square wave pulse, the amplitude and cycle of which increases, according to an embodiment of the disclosure.

According to an embodiment, in operation 402, the processor 250 may determine the attribute of the first ultrasonic signal oscillated by the ultrasonic sensor 210 such that the first ultrasonic signal is oscillated in the form of a square wave pulse according to a width 611, a cycle 612, and an amplitude 613 as illustrated in FIG. 6A. When the first ultrasonic signal is oscillated in the form of the square wave pulse, because the ultrasonic sensor 210 obtains the second ultrasonic signal in the square wave pulse form reflected on a fingerprint, the reflected second ultrasonic signal may be distinguished from the noise signal obtained continuously.

In an embodiment, the processor 250 may determine the attribute of the first ultrasonic signal such that, as illustrated in FIG. 6B, compared with the square wave pulse of FIG. 6A, the first ultrasonic signal has the form of a square wave pulse of which a width 621 is narrower, of which a cycle 622 is the same, and of which amplitude 623 is greater.

In another embodiment, the processor 250 may determine the attribute of the first ultrasonic signal such that, as illustrated in FIG. 6C, compared with the square wave pulse of FIG. 6A, the first ultrasonic signal has the form of a square wave pulse of which a width 631 is the same, of which a cycle 632 is longer, and of which amplitude 623 is greater.

When the ultrasonic sensor 210 oscillates the first ultrasonic signal determined as illustrated in FIGS. 6A to 6C in operation 403, the processor 250 may obtain the second ultrasonic signal corresponding to the first ultrasonic signal in the oscillated form in operation 404. In operation 405, the processor 250 may obtain fingerprint information based on the obtained second ultrasonic signal and the attribute of the first ultrasonic signal. That is, the processor 250 may obtain fingerprint information, using only the second ultrasonic signal corresponding to the square wave pulse form of the first ultrasonic signal while excluding an ultrasonic signal not having a square wave pulse of the first ultrasonic signal.

According to an embodiment, when the frequency of first ultrasonic wave oscillated by the ultrasonic sensor 210 is 3 MHz and the frequency of the noise signal obtained in operation 401 is 3 MHz, interference may occur in the second ultrasonic signal obtained by the ultrasonic sensor 210. In operation 402, the processor 250 may determine the frequency of the first ultrasonic signal such that the frequency of the first ultrasonic signal oscillated by the ultrasonic sensor 210 is different from the frequency of the noise signal by the preset band or more. For example, when the frequency of the noise signal is 3 MHz, the processor 250 may determine that the frequency of the first ultrasonic oscillated by the ultrasonic sensor 210 is 7 MHz.

The ultrasonic sensor 210 may oscillate the first ultrasonic signal of 7 MHz in operation 403, and the processor 250 may obtain the second ultrasonic signal of 7 MHz and the noise signal of 3 MHz in operation 404. In operation 405, the processor 250 may obtain fingerprint information, using only the second ultrasonic signal of 7 MHz as a valid signal.

Figure 7A:
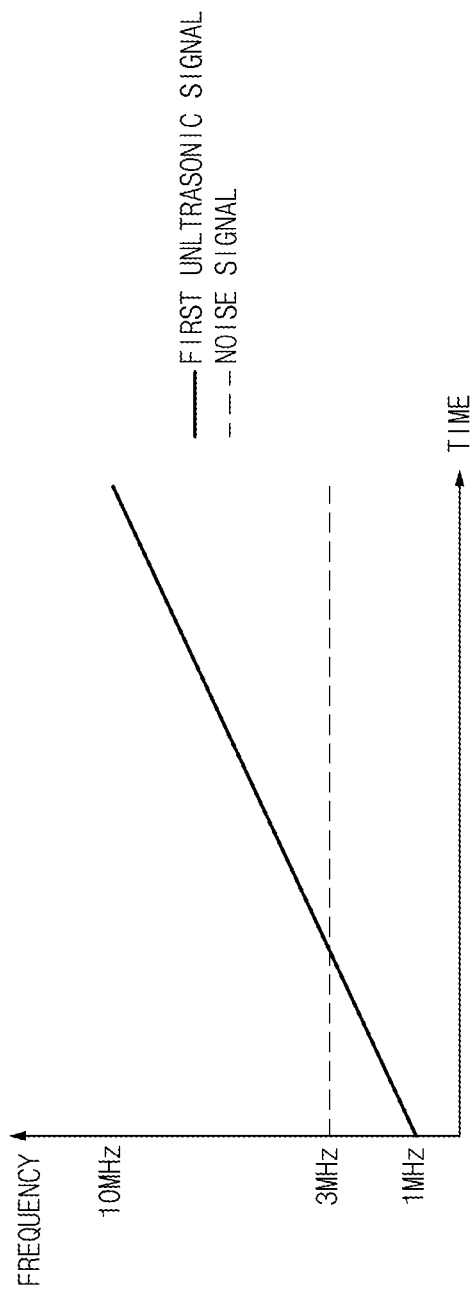
FIG. 7A is a graph illustrating a frequency of an oscillation ultrasonic signal increasing with time, according to an embodiment of the disclosure.
Figure 7B:
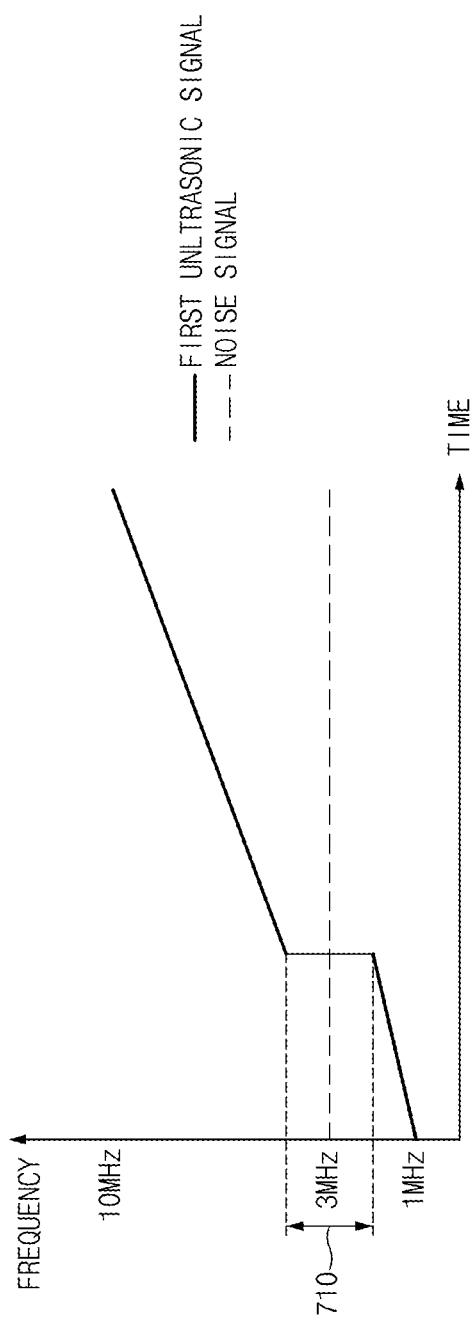
FIG. 7B is a graph illustrating a frequency of an oscillation ultrasonic signal increasing within a range other than a specific range with time, according to an embodiment of the disclosure.

FIG. 7A is a graph illustrating a frequency of a first ultrasonic signal increasing with time, according to an embodiment of the disclosure. FIG. 7B is a graph illustrating a frequency of a first ultrasonic signal increasing within a range other than a specific range with time, according to an embodiment of the disclosure.

In an embodiment, in operation 402, the processor 250 may determine the frequency of the first ultrasonic signal such that the frequency of the first ultrasonic signal oscillated by the ultrasonic sensor 210 is changed with time within the preset frequency range, and the ultrasonic sensor 210 may oscillate the first ultrasonic signal, the frequency of which is changed, in operation 403. For example, as illustrated in 7A, the processor 250 may determine the frequency of the first ultrasonic signal such that the frequency of the first ultrasonic wave oscillated by the ultrasonic sensor 210 increases from 1 MHz to 10 MHz with time.

In the embodiment of FIG. 7A, when the frequency of the noise signal is 3 MHz and the frequency of the first ultrasonic wave oscillated by the ultrasonic sensor 210 is changed, the ultrasonic sensor 210 may obtain the second ultrasonic signal, which is not interfered with the noise signal in operation 404. In operation 405, the processor 250 may obtain fingerprint information based on the second ultrasonic signal, the frequency of which increases from 1 MHz to 10 MHz.

In another embodiment, the frequency of the first ultrasonic signal oscillated by the ultrasonic sensor 210 may be changed with time within a preset frequency range; the frequency of the first ultrasonic signal may be determined to change the frequency of the first ultrasonic signal within a frequency range other than a frequency range including a frequency of the noise signal with time, and in operation 403, the ultrasonic sensor 210 may oscillate the first ultrasonic signal, the frequency of which is changed. For example, as illustrated in FIG. 7B, the processor 250 may determine the frequency of the first ultrasonic signal such that the frequency of the first ultrasonic signal oscillated by the ultrasonic sensor 210 increases with time within a range other than a frequency range 710 including 3 MHz, which is the frequency of the noise signal, between 1 MHz and 10 MHz.

In the embodiment of FIG. 7B, when the frequency of the noise signal is 3 MHz and the frequency of the first ultrasonic wave oscillated by the ultrasonic sensor 210 is changed within a range other than the frequency range 710 including 3 MHz, the ultrasonic sensor 210 may obtain the second ultrasonic signal, which is not interfered with the noise signal in operation 404. In operation 405, the processor 250 may obtain fingerprint information based on the second ultrasonic signal, the frequency of which increases from 1 MHz to 10 MHz other than the frequency range 710 including 3 MHz. In an embodiment, when the ultrasonic sensor 210 oscillates the first ultrasonic signal of the frequency determined as illustrated in FIGS. 7A and 7B in operation 403, the processor 250 may obtain fingerprint information based on the second ultrasonic signal corresponding to a plurality of different frequencies in operation 405.

In another embodiment, the fingerprint information may be obtained based on the remaining obtained signals other than the obtained signal corresponding to the first ultrasonic signal oscillated with the frequency of the noise signal among the obtained signals corresponding to the first ultrasonic signal oscillated with the changing frequency. For example, as illustrated in FIG. 7A, when the first ultrasonic signal of the determined frequency is oscillated and the second ultrasonic signal corresponding to the oscillated first ultrasonic signal is obtained, the processor 250 may obtain fingerprint information based on the remaining second ultrasonic signal other than the second ultrasonic signal of 3 MHz. For example, the processor 250 may obtain fingerprint information, using the second ultrasonic signal corresponding to 5 MHz and the second ultrasonic signal corresponding to 7 MHz.

Hereinafter, for the purpose of determining the attribute of an ultrasonic signal reflected on a user's fingerprint, a method of obtaining fingerprint information to which a procedure of first oscillating an ultrasonic signal is added will be described with reference to FIGS. 8 to 12.

Figure 8:
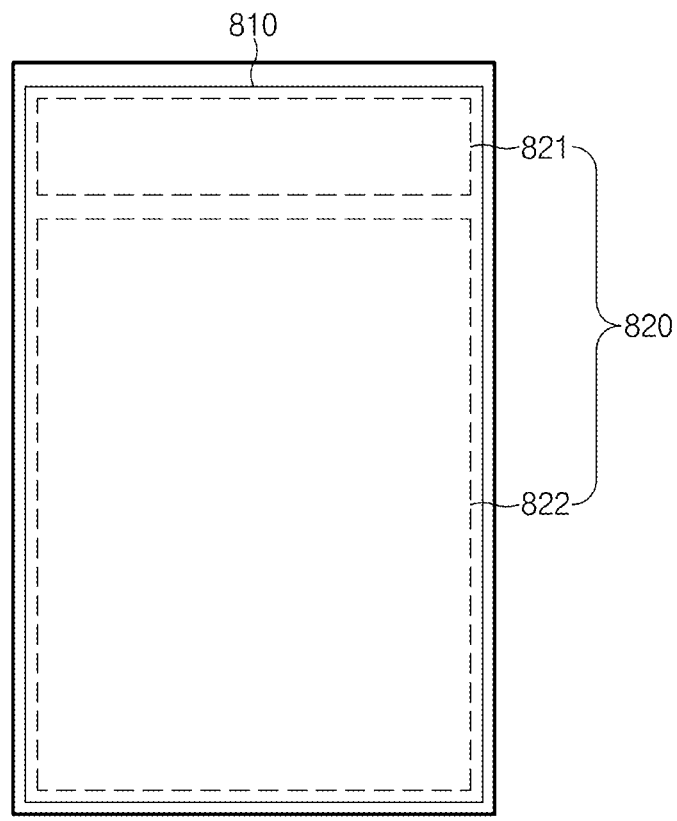
FIG. 8 is view illustrating a display and an oscillation unit and a receiving unit of an ultrasonic sensor, according to an embodiment of the disclosure.

FIG. 8 is a view illustrating a display and a first ultrasonic sensor and a second ultrasonic sensor of an ultrasonic sensor, according to an embodiment of the disclosure. The structure of the electronic device illustrated in FIG. 8 may correspond to the structure of the electronic device illustrated in FIG. 1C. For example, a display 810 of FIG. 8 may correspond to the display 130 of FIG. 1C; a first ultrasonic sensor 821 of FIG. 8 may correspond to the first ultrasonic sensor 110 of FIG. 1C; a second ultrasonic sensor 822 of FIG. 8 may correspond to the second ultrasonic sensor 120 of FIG. 1C.

Referring to FIG. 8, the electronic device may include the display 810 and an ultrasonic sensor 820. According to an embodiment, the display 810 may include a screen glass, and the ultrasonic sensor 820 may include the first ultrasonic sensor 821 and the second ultrasonic sensor 822. The first ultrasonic sensor 821 may be positioned in a first area of the rear surface of the display 810 and may vibrate the display 810 or a screen glass to oscillate a first ultrasonic signal; and then the first ultrasonic sensor 821 may obtain a second ultrasonic signal which is an ultrasonic signal that the first ultrasonic signal is reflected back to an object (e.g., the fingerprint of the user contacting the screen glass). That is, the first ultrasonic sensor 821 may include an ultrasonic oscillation unit and an ultrasonic receiving unit. The second ultrasonic sensor 822 may be positioned in a second area of the rear surface of the display 810 and may obtain the second ultrasonic signal which is an ultrasonic signal that the first ultrasonic signal oscillated by the first ultrasonic sensor 821 is reflected back to an object. That is, the second ultrasonic sensor 822 may include an ultrasonic receiving unit.

Hereinafter, embodiments of the disclosure will be described assuming that the display 230 and the ultrasonic sensor 210 of the electronic device are positioned in the same manner as the display 810 and the ultrasonic sensor 820 of FIG. 8.

Figure 9:
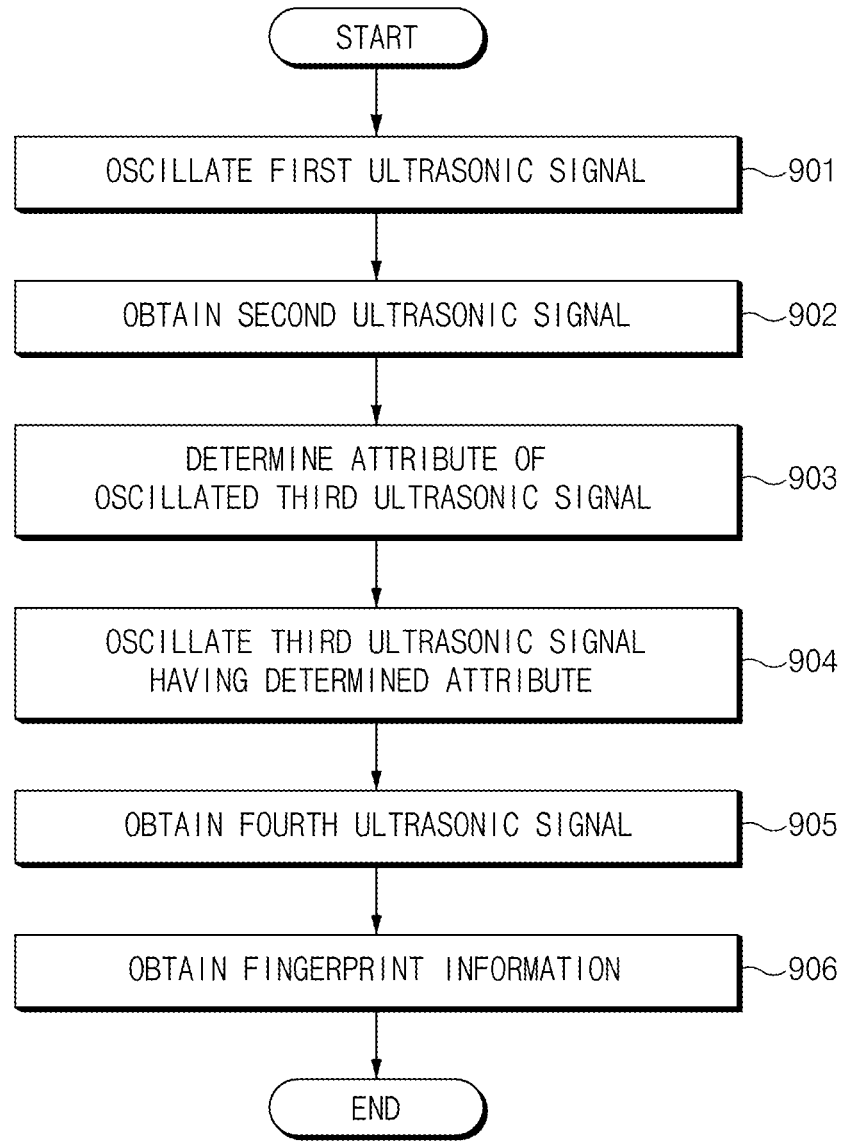
FIG. 9 is a flowchart illustrating a procedure in which an ultrasonic signal oscillated by a first ultrasonic sensor is obtained by a first ultrasonic sensor and a second ultrasonic sensor and then fingerprint information is obtained based on an obtained signal, according to an embodiment of the disclosure.

FIG. 9 is a flowchart illustrating a procedure in which an ultrasonic signal oscillated by a first ultrasonic sensor is obtained by a first ultrasonic sensor and a second ultrasonic sensor and then fingerprint information is obtained based on an obtained signal, according to an embodiment of the disclosure.

Operation 902 to operation 906 may correspond to operation 301 to operation 305 in FIG. 3.

In operation 901, the ultrasonic sensor 210 may oscillate a first ultrasonic signal. The ultrasonic sensor 210 may oscillate the first ultrasonic signal having a preset attribute. In an embodiment, the ultrasonic sensor 210 may vibrate a screen glass to oscillate the first ultrasonic signal.

In operation 902, the processor 250 may obtain a second ultrasonic signal through the ultrasonic sensor 210. According to an embodiment, the first ultrasonic signal oscillated in operation 901 may be reflected on an object or the like, and the ultrasonic sensor 210 may obtain a second ultrasonic signal that is the reflected first ultrasonic signal to transmit the second ultrasonic signal to the processor 250.

In an embodiment, the second ultrasonic signal obtained by the ultrasonic sensor 210 may be proportional to the strength of the first ultrasonic signal oscillated in operation 901. For example, in the case where the ultrasonic sensor 210 oscillates the first ultrasonic signal with strength of '10' and the ultrasonic sensor 210 receives the second ultrasonic signal of strength of '6', when the ultrasonic sensor 210 oscillates the first ultrasonic signal with strength of '5', the ultrasonic sensor 210 may receive the second ultrasonic signal of strength '3'.

In an embodiment, when the first ultrasonic sensor 821 vibrates a screen glass at a location illustrated in FIG. 8 to oscillate the first ultrasonic signal, the vibration occurring on the screen glass may be transmitted from a top end to a bottom end. At this time, when a crack occurs in the screen glass, in the screen glass, the screen glass may be divided into two areas, such as a first area, which is an area from the top end of the screen glass to a location at which the crack occurs, and a second area that is an area from the location at which the crack occurs to the bottom end of the screen glass. The strength of vibration occurring at the top end of the screen glass may be reduced by the crack, and the vibration of the reduced strength may be transmitted to the second area of the screen glass. Because the first ultrasonic signal is oscillated by the vibration of the screen glass, the strength of the first ultrasonic signal oscillated in the second area may be less than the strength of the first ultrasonic signal oscillated in the first area. As such, the strength of the second ultrasonic signal obtained in the second area may be less than the strength of the second ultrasonic signal obtained in the first area. An embodiment in which the strength of each of the first ultrasonic signal and the second ultrasonic signal is changed for each area due to the crack will be described with reference to FIGS. 10A and 10B In operation 903, the processor 250 may determine the attribute of a third ultrasonic signal oscillated by the ultrasonic sensor 210, based on the second ultrasonic signal. For example, the processor 250 may determine the strength of the third ultrasonic signal oscillated by the ultrasonic sensor 210, based on the strength of the second ultrasonic signal.

In an embodiment, when the strength of the second ultrasonic signal obtained in at least a partial area is less than a preset value (e.g., a threshold value that is a standard where the processor 250 determines a valid signal to obtain the fingerprint information), the processor 250 may determine the strength of the third ultrasonic signal, such that the strength of the third ultrasonic signal is greater than the strength of the first ultrasonic signal.

For example, when the strength of the first ultrasonic signal is 8, when the strength of the second ultrasonic signal obtained in at least a partial area is 4, and when the threshold value is 6, the processor 250 may determine that the strength of the third ultrasonic signal is 15. This is the reason that it is possible to obtain fingerprint information based on a fourth ultrasonic signal in operation 906 only when the strength of the fourth ultrasonic signal obtained in operation 905 to be described later is greater than a threshold value. The detailed embodiment will be described in detail with reference to FIGS. 10A and 10B.

In operation 904, the ultrasonic sensor 210 may oscillate the third ultrasonic signal having the determined attribute. For example, the ultrasonic sensor 210 may oscillate the third ultrasonic signal of the strength that is determined by the processor 250 in operation 903.

In operation 905, the processor 250 may obtain the fourth ultrasonic signal through the ultrasonic sensor 210. The ultrasonic sensor 210 may obtain the fourth ultrasonic signal to transmit the fourth ultrasonic signal to the processor 250. Herein, the fourth ultrasonic signal obtained by the ultrasonic sensor 210 may be a signal obtained by the reflection of the third ultrasonic signal, which is oscillated by the ultrasonic sensor 210 in operation 904, on an object, or the like.

In operation 906, the processor 250 may obtain fingerprint information based on the fourth ultrasonic signal and the attribute of the third ultrasonic signal. In an embodiment, the processor 250 may obtain fingerprint information based on the fourth ultrasonic signal obtained with the strength of a preset threshold value or more.

In an embodiment, when the strength of the second ultrasonic signal obtained in at least a partial area in operation 902 is less than a preset threshold value or when the strength of the third ultrasonic signal determined in operation 903 is not set to be greater than the strength of the first ultrasonic signal, the processor 250 may reduce the threshold value of the at least a partial area. For example, when the strength of the first ultrasonic signal is 10, when the strength of the second ultrasonic signal obtained in the second area is 5, when the threshold value is 7, and when the strength of the third ultrasonic signal is 10, the strength of the fourth ultrasonic signal obtained in the second area is 5. The processor 250 may set the threshold value of the second area to 3 and may obtain the fingerprint information based on the fourth ultrasonic signal of the strength greater than 3, for the purpose of obtaining the fingerprint information based on the fourth ultrasonic signal.

Hereinafter, the detailed embodiment of operation 901 to operation 906 will be described with reference to FIGS. 10A to 11E.

Figure 10A:
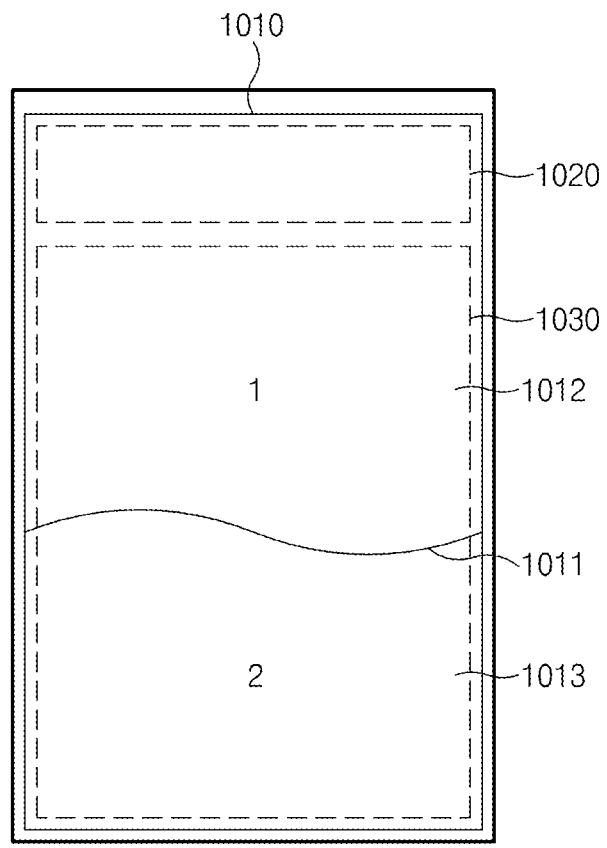
FIG. 10A is a view illustrating a first area and a second area of a display divided based on a crack, according to an embodiment of the disclosure.
Figure 10B:
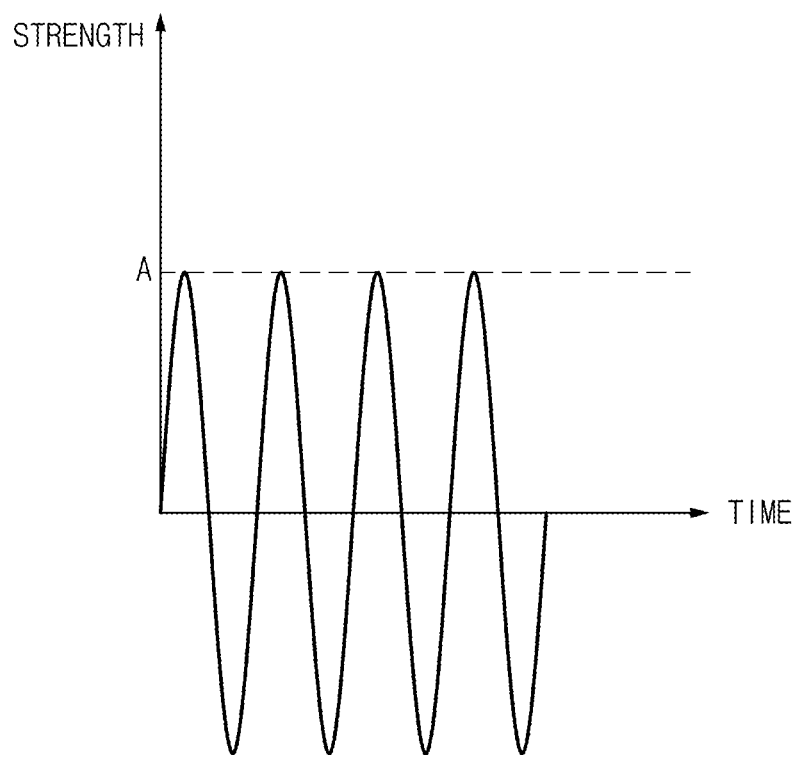
FIG. 10B is a graph illustrating strength of vibration generated by a first ultrasonic sensor in operation 901, according to an embodiment of the disclosure.
Figure 10C:
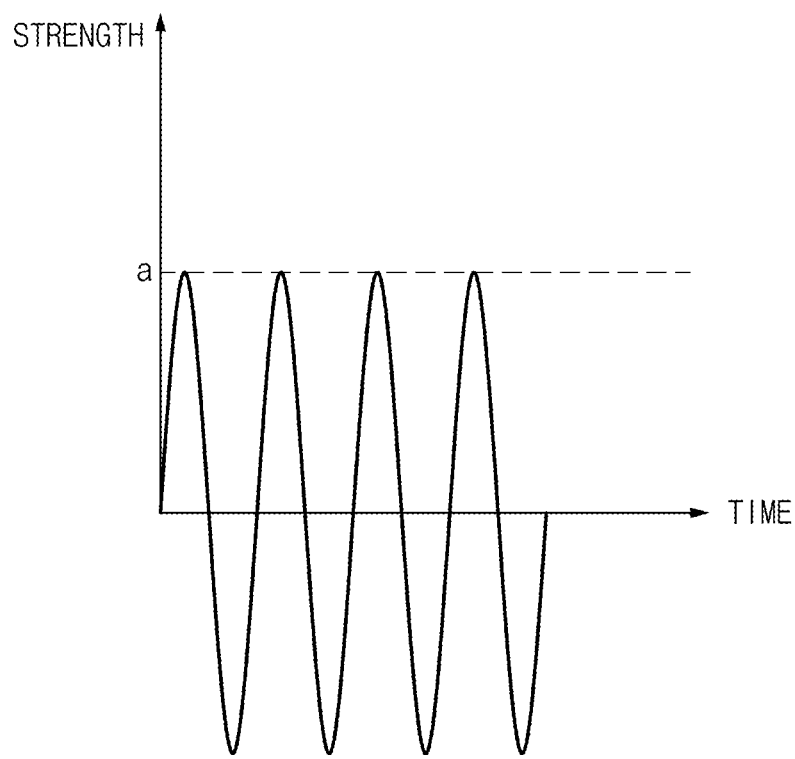
FIG. 10C is a graph illustrating strength of a second ultrasonic signal obtained in a first area in operation 902, according to an embodiment of the disclosure.
Figure 10D:
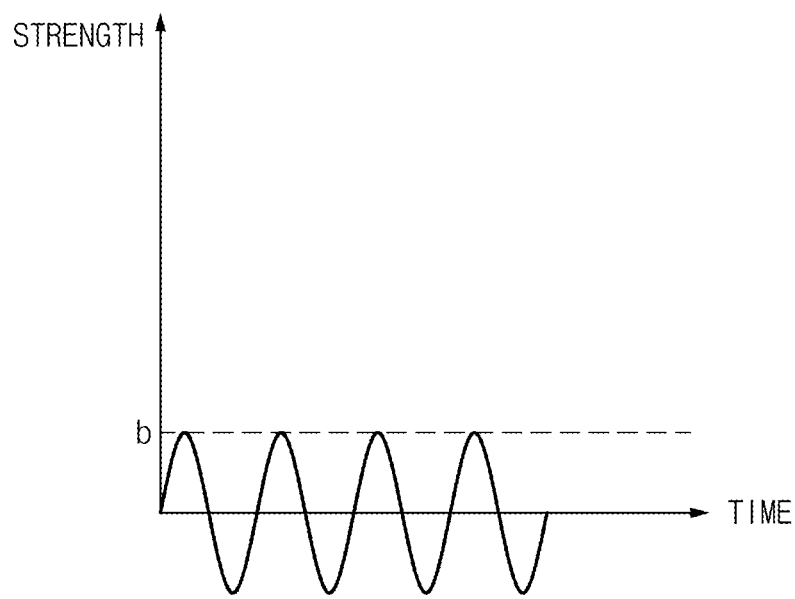
FIG. 10D is a graph illustrating strength of a second ultrasonic signal obtained in a second area in operation 902, according to an embodiment of the disclosure.
Figure 10E:
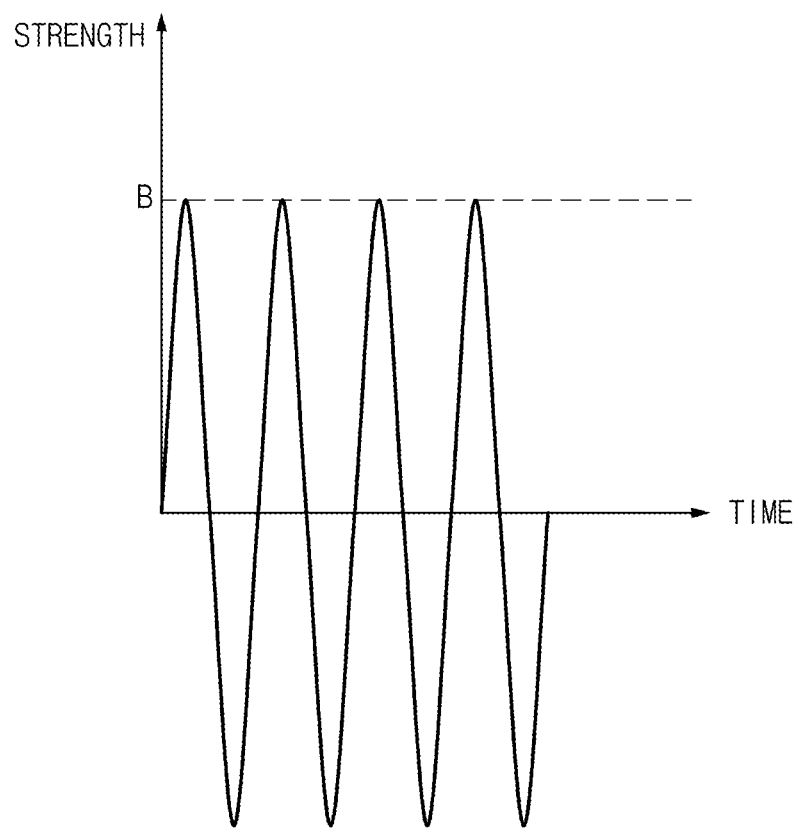
FIG. 10E is a graph illustrating strength of vibration generated by a first ultrasonic sensor in operation 904, according to an embodiment of the disclosure.
Figure 10F:
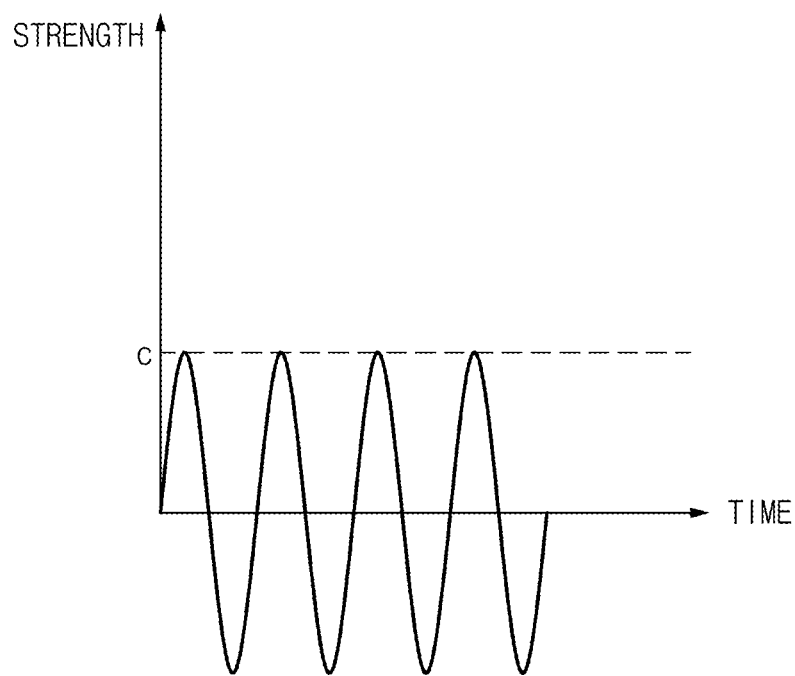
FIG. 10F is a graph illustrating strength of a fourth ultrasonic signal obtained in a second area in operation 905, according to an embodiment of the disclosure.

FIG. 10A is a view illustrating a first area and a second area of a display divided based on a crack, according to an embodiment of the disclosure. FIG. 10B is a graph illustrating strength of vibration generated by a first ultrasonic sensor in operation 901, according to an embodiment of the disclosure. FIG. 10C is a graph illustrating strength of a second ultrasonic signal obtained in a first area in operation 902, according to an embodiment of the disclosure. FIG. 10D is a graph illustrating strength of a second ultrasonic signal obtained in a second area in operation 902, according to an embodiment of the disclosure. FIG. 10E is a graph illustrating strength of vibration generated by a first ultrasonic sensor in operation 904, according to an embodiment of the disclosure. FIG. 10F is a graph illustrating strength of a fourth ultrasonic signal obtained in a second area in operation 905, according to an embodiment of the disclosure.

According to an embodiment, as illustrated in FIG. 10A, a display 1010 or a screen glass may include a crack 1011, and the display 1010 or the screen glass may include a first area 1012 and a second area 1013 divided based on the crack 1011. A first ultrasonic sensor 1020 and a second ultrasonic sensor 1030 may be disposed on the rear surface of the display 1010.

The first ultrasonic sensor 1020 may vibrate the display 1010 or the screen glass to oscillate a first ultrasonic signal (operation 901). At this time, the first ultrasonic sensor 1020 may generate the vibration of strength 'A' as illustrated in FIG. 10B in the display 1010 or the screen glass. The vibration generated by the first ultrasonic sensor 1020 may be transmitted from the top end of the display 1010, in which the first ultrasonic sensor 1020 is positioned, to the bottom end thereof, and the crack 1011 of the display 1010 may reduce the vibration transmitted from the first area to the second area. Due to the reduction of the vibration, the strength of the vibration generated in the display 1010 or the screen glass of the second area may be less than strength 'A', and the strength of the first ultrasonic signal oscillated in the display 1010 or the screen glass may be less than the strength of the first ultrasonic signal oscillated in the first area.

The first ultrasonic sensor 1020 and the second ultrasonic sensor 1030 may obtain the second ultrasonic signal obtained by the reflection of the oscillated first ultrasonic signal on an object (e.g., a user's fingerprint or the like), or the like (operation 902). The first ultrasonic sensor 1020 and the second ultrasonic sensor 1030 may obtain the second ultrasonic signal of strength 'a' as illustrated in FIG. 10C, in the first area. The second ultrasonic sensor 1030 may obtain the second ultrasonic signal of strength 'b' as illustrated in FIG. 10D, in the second area. Because the strength of the first ultrasonic signal oscillated in the second area is less than the strength of the first ultrasonic signal oscillated in the first area, the strength 'b' may be less than strength 'a'.

In an embodiment, when strength 'b' is less than a threshold value, the processor 250 may not determine that the second ultrasonic signal obtained in the second area is a valid signal for obtaining fingerprint information. As such, the processor 250 may determine the strength of the third ultrasonic signal oscillated by the first ultrasonic sensor 1020, based on the magnitude of the second ultrasonic signal such that the processor 250 obtains fingerprint information of the fingerprint of the user contacting the second area of the screen glass. For example, the processor 250 may determine that the strength of the vibration generated in the display 1010 or the screen glass by the first ultrasonic sensor 1020 is strength '13' as illustrated in FIG. 10E (operation 903).

The first ultrasonic sensor may generate the vibration of strength 'B' in the display 1010 or the screen glass and may oscillate a third ultrasonic signal (operation 904). The vibration generated by the first ultrasonic sensor 1020 may be transmitted from the top end of the display 1010 or the screen glass to the bottom end, and the strength of the vibration transmitted to the second area of the display 1010 or the screen glass may be less than '13' due to the crack. However, the strength of the vibration transmitted to the second area of the display 1010 or the screen glass in operation 904 may be greater than the strength of the vibration transmitted to the second area of the display 1010 or the screen glass in operation 901.

The first ultrasonic sensor 1020 and the second ultrasonic sensor 1030 may obtain the fourth ultrasonic signal obtained by the reflection of the oscillated third ultrasonic signal on an object or the like (operation 905). At this time, the second ultrasonic sensor 1030 may obtain the fourth ultrasonic signal of strength c' as illustrated in FIG. 10F, in the second area. Because the strength of the third ultrasonic signal oscillated in the second area is greater than the strength of the first ultrasonic signal, strength 'c' may be greater than strength 'b'.

In an embodiment, strength 'c' may be greater than a threshold value, and the processor 250 may obtain fingerprint information by determining that the fourth ultrasonic signal obtained in the second area is a valid signal (operation 906).

According to an embodiment, even though the strength of the fourth ultrasonic signal obtained in the second area in operation 905 is greater than the strength of the second ultrasonic signal obtained in the second area in operation 902, the strength of the fourth ultrasonic signal may be less than the threshold value. For the purpose of using the fourth ultrasonic signal less than the threshold value as a valid signal, the processor 250 may reduce the threshold value of the fourth ultrasonic signal obtained in the second area. For example, when the threshold value is less than strength 'a', is greater than strength 'b', and is greater than strength 'c', the processor 250 may set the threshold value of the fourth ultrasonic signal obtained in the second area to be less than strength 'b'. As such, the processor 250 may obtain fingerprint information, using the fourth ultrasonic signal obtained in the second area as a valid signal.

In the meantime, according to an embodiment, when the second ultrasonic signal of a preset value or less is obtained in at least a partial area of the display 230 or the screen glass in operation 902, the processor 250 may display a preset message or UI.

Figure 11A:
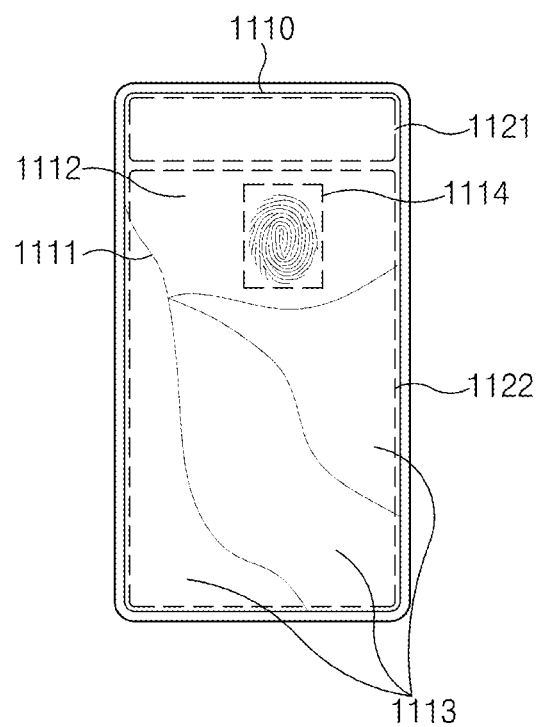
FIG. 11A is a view illustrating an electronic device that displays a guide UI for inducing a fingerprint input in an area in which a crack of a display is not generated, according to an embodiment of the disclosure.
Figure 11B:
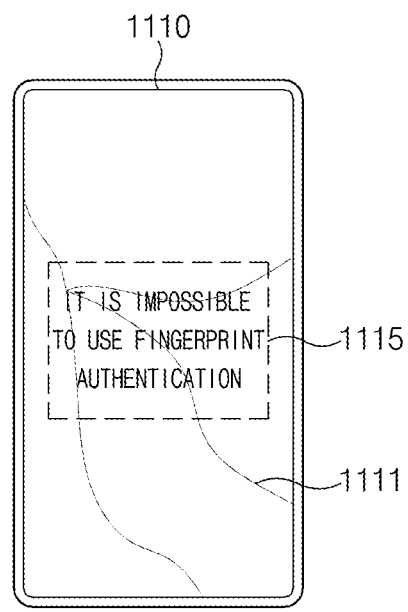
FIG. 11B is a view illustrating an electronic device that displays a message indicating that fingerprint information is not capable of being obtained because a crack is generated in a display, according to an embodiment of the disclosure.
Figure 11C:
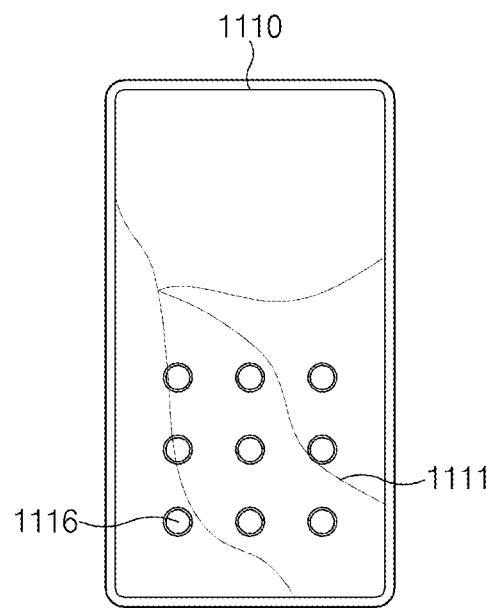
FIG. 11C is a view illustrating an electronic device that displays a pattern recognition UI after a crack is generated in a display, according to an embodiment of the disclosure.

FIG. 11A is a view illustrating an electronic device that displays a guide UI for inducing a fingerprint input in an area in which a crack of a display is not generated, according to an embodiment of the disclosure. FIG. 11B is a view illustrating an electronic device that displays a message indicating that fingerprint information is not capable of being obtained because a crack is generated in a display, according to an embodiment of the disclosure. FIG. 11C is a view illustrating an electronic device that displays a pattern recognition UI after a crack is generated in a display, according to an embodiment of the disclosure.

According to an embodiment, as illustrated in FIG. 11A, a display 1110 or the screen glass may include a crack 1111, and the display 1110 or the screen glass may include a first area 1112 and one or more second areas 1113 divided based on the crack 1111. A first ultrasonic sensor 1121 and a second ultrasonic sensor 1122 may be disposed on the rear surface of the display 1110. As in the embodiment according to FIGS. 10A to 10F, the strength of the second ultrasonic signal obtained in the first area 1112 divided based on the crack 1111 may be greater than a threshold value, and the strength of the second ultrasonic signal obtained in the second area 1113 may be less than the threshold value. Because the processor 250 determines that an ultrasonic signal, the value of which is less than a preset threshold value, is an invalid signal, the processor 250 may not obtain fingerprint information, using the ultrasonic signal, the value of which is less than a threshold value. Accordingly, the processor 250 may not obtain fingerprint information from the fingerprint of a user contacting the second area 1113 of the display 1110 or the screen glass.

In an embodiment, for the purpose of inducing the contact of a user's fingerprint to the first area 1112 of the display 1110 or the screen glass in which an ultrasonic signal of the threshold value or more is obtained, as illustrated in FIG. 11A, the processor 250 may display a guide UI 1114 for inducing a fingerprint input in the first area 1112 of the display 1110.

In another embodiment, when the second ultrasonic signal of the threshold value or less is obtained in at least a partial area of the display 1110, as illustrated in FIG. 11B, the processor 250 may display a message 1115 indicating that it is impossible to obtain fingerprint information, in the display 1110.

In another embodiment, when the second ultrasonic signal of the threshold value or less is obtained in at least a partial area of the display 1110, as illustrated in FIG. 11C, the processor 250 may display a pattern input UI 1116. In addition to the exemplification of FIG. 11C, the processor 250 may display a password input UI or an iris recognition UI. When the second ultrasonic signal of the threshold value or less is obtained, the processor 250 may perform unlocking using a method such as pattern recognition induced with the UI, iris recognition, or the like, instead of the fingerprint recognition.

Figure 11D:
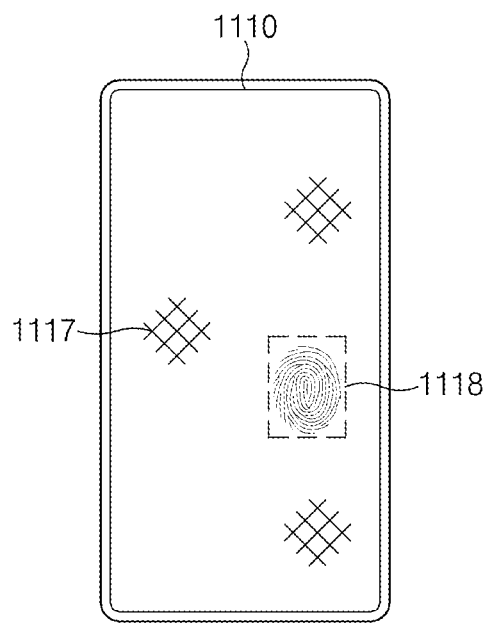
FIG. 11D is a view illustrating an electronic device that displays a guide UI for inducing a fingerprint input in an area in which a scratch of a display is not generated, according to an embodiment of the disclosure.
Figure 11E:
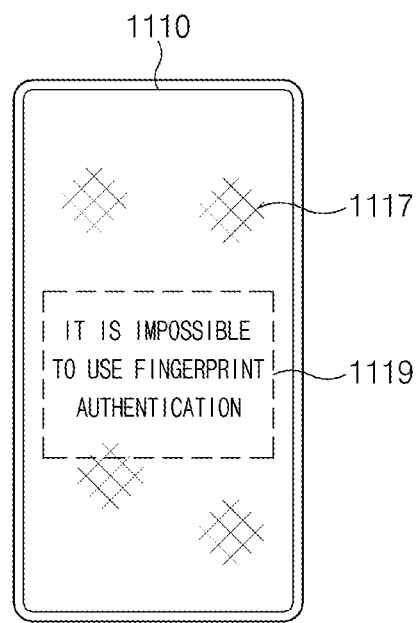
FIG. 11E is a view illustrating an electronic device that displays a message indicating that fingerprint information is not capable of being obtained because a scratch is generated in a display, according to an embodiment of the disclosure.

FIG. 11D is a view illustrating an electronic device that displays a guide UI for inducing a fingerprint input in an area in which a scratch of a display is not generated, according to an embodiment of the disclosure. FIG. 11E is a view illustrating an electronic device that displays a message indicating that fingerprint information is not capable of being obtained because a scratch is generated in a display, according to an embodiment of the disclosure.

In an embodiment, when a scratch 1117 is generated in the display 1110, in operation 902, the second ultrasonic signal of the threshold value or less may be obtained in the area of the display 1110 in which the scratch 1117 is generated, and the second ultrasonic signal of more than the threshold value may be obtained in the area of the display 1110 in which the scratch 1117 is not generated.

As illustrated in FIG. 11D, the processor 250 may display a guide UI 1118 for inducing a fingerprint input to the partial area of the display 1110 in which the second ultrasonic signal of more than the threshold value is obtained.

In another embodiment, when the second ultrasonic signal of the threshold value or less is obtained in at least a partial area of the display 1110, as illustrated in FIG. 11E, the processor 250 may display a message 1119 indicating that it is impossible to obtain fingerprint information, in the display 1110.

Figure 12:
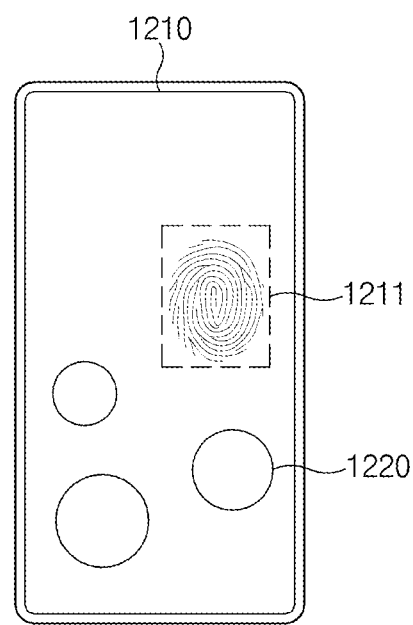
FIG. 12 is a view illustrating an electronic device that displays a guide UI for inducing a fingerprint input in an area in which moisture of a display is not contacted is not generated, according to an embodiment of the disclosure.

FIG. 12 is a view illustrating an electronic device that displays a guide UI for inducing a fingerprint input in an area in which moisture of a display is not contacted is not generated, according to an embodiment of the disclosure.

When a user's fingerprint contacts an area 1220 with the moisture of a display 1210, the reflected ultrasonic signal may not reflect the fingerprint information of the user due to the moisture.

In an embodiment, when the display 1210 includes a touch screen panel, as illustrated in FIG. 12, the touch screen panel may obtain a touch input having a preset electrostatic feature in an area with the moisture of the display 1210. When a touch input having a preset electrostatic feature is obtained via a touch screen panel, as illustrated in FIG. 12, the processor 250 may display a guide UI 1211 for inducing a fingerprint input in an area, in which a preset touch input is not recognized, within the area of the display 1210.

According to an embodiment, the processor 250 may obtain a temperature value at a periphery of an electronic device, via a temperature sensor. The feature of an ultrasonic wave (e.g., the speed of an ultrasonic wave) may vary depending on the temperature. The processor 250 may determine the attribute of the ultrasonic signal oscillated by an ultrasonic sensor, further using the obtained temperature value, and the ultrasonic sensor may oscillate an ultrasonic signal having the determined attribute.

An electronic device according to an embodiment may include an ultrasonic sensor and a processor electrically connected to the ultrasonic sensor. The processor may be configured to obtain a noise signal at a periphery of the electronic device, via the ultrasonic sensor, to determine an attribute of a first ultrasonic signal oscillated by the ultrasonic sensor, based on the obtained noise signal, and to obtain fingerprint information based on the second ultrasonic signal obtained via the ultrasonic sensor and the determined attribute.

In an electronic device according to an embodiment, the processor may be configured to determine strength of a first ultrasonic signal oscillated by the ultrasonic sensor, based on the strength of the noise signal when the noise signal of strength of a preset value or more is obtained.

In an electronic device according to an embodiment, the processor may be configured to determine a threshold value based on the determined strength of the first ultrasonic signal and to obtain the fingerprint information, based on a second ultrasonic signal obtained with strength of the determined threshold value or more.

In an electronic device according to an embodiment, the ultrasonic sensor may periodically oscillate the first ultrasonic signal in a form of a square wave pulse, and the processor may be configured to determine at least one of a width of the square wave pulse, an amplitude of the square wave pulse, and a cycle of the square wave pulse, based on the noise signal.

In an electronic device according to an embodiment, the processor may be configured to determine a frequency of the first ultrasonic signal such that the frequency of the first ultrasonic signal oscillated by the ultrasonic sensor is different from a frequency of the noise signal by a preset band or more.

In an electronic device according to an embodiment, the processor may be configured to determine a frequency of the first ultrasonic signal such that the frequency of a first ultrasonic signal oscillated by the ultrasonic sensor is changed with time within a preset frequency range and to obtain fingerprint information based on the second ultrasonic signal corresponding to a first ultrasonic signal oscillated with the changed frequency.

In an electronic device according to an embodiment, the processor may be configured to determine the frequency of the first ultrasonic signal such that a frequency of a first ultrasonic signal oscillated by the ultrasonic sensor is changed with time within a frequency range other than a frequency range including a frequency of the noise signal within the preset frequency range.

In an electronic device according to an embodiment, the processor may be configured to obtain fingerprint information based on a second ultrasonic signal other than the second ultrasonic signal corresponding to the first ultrasonic signal oscillated with the frequency of the noise signal among the second ultrasonic signal corresponding to a first ultrasonic signal oscillated with the changed frequency.

The electronic device according to an embodiment may further include a display electrically connected to the processor. The ultrasonic sensor may include an oscillation unit oscillating the first ultrasonic signal and a receiving unit obtaining the second ultrasonic signal. The oscillation unit may vibrate the display in a first area of the display to oscillate the first ultrasonic signal, and the receiving unit may obtain the second ultrasonic signal in at least a partial area in a second area other than the first area of the display.

The electronic device according to an embodiment may further include a temperature sensor measuring temperature at a periphery of the electronic device. The processor may be configured to determine an attribute of the first ultrasonic signal, further using temperature obtained via the temperature sensor.

In an electronic device according to an embodiment, an electronic device may include a display, an ultrasonic sensor positioned on a rear surface of the display and obtaining an ultrasonic signal in at least a partial area of the display and a processor electrically connected to the display and the ultrasonic sensor. The processor may be configured to oscillate a first ultrasonic signal via the ultrasonic sensor, to obtain a second ultrasonic signal corresponding to the first ultrasonic signal via the ultrasonic sensor, to determine an attribute of a third ultrasonic signal oscillated by the ultrasonic sensor, based on the obtained second ultrasonic signal, to oscillate the third ultrasonic signal via the ultrasonic sensor, and to obtain fingerprint information via the ultrasonic sensor based on a fourth ultrasonic signal corresponding to the third ultrasonic signal and the determined attribute.

In an electronic device according to an embodiment, the processor may be configured to obtain fingerprint information based on a fourth ultrasonic signal of a threshold value or more and to set a threshold value of a fourth ultrasonic signal obtained in an area, in which the second ultrasonic signal less than a preset threshold value is obtained, in an area of the display to a value less than the preset threshold value.

In an electronic device according to an embodiment, the processor may be configured to determine strength of a first ultrasonic signal oscillated by the ultrasonic sensor, based on strength of the second ultrasonic signal, when the second ultrasonic signal of a preset value or less is obtained in at least the partial area of the display.

In an electronic device according to an embodiment, the processor may be configured to display a message indicating that it is impossible to obtain the fingerprint information, in the display, when the second ultrasonic signal of a preset value or less is obtained in at least the partial area of the display.

In an electronic device according to an embodiment, the processor may be configured to display a guide UI for inducing a fingerprint input in an area of the display in which the second ultrasonic signal of more than a preset value is obtained, when the second ultrasonic signal of a preset value or less is obtained in at least the partial area of the display.

In an electronic device according to an embodiment, the processor may be configured to display at least one UI of a password input UI, an iris recognition UI, and a pattern input UI, in the display when the second ultrasonic signal of a preset value or less is obtained in at least the partial area of the display.

In an electronic device according to an embodiment, the display may include a touch screen panel obtaining a touch input, the processor may be configured to display a guide UI for inducing a fingerprint input in an area where a touch input is not recognized in the area of the display, when a touch input having a preset electrostatic feature is obtained via the touch screen panel.

In an electronic device according to an embodiment, a computer-readable recording medium storing instructions, when executed by a processor of an electronic device, the instructions may cause the electronic device to perform obtaining a first ultrasonic signal via an ultrasonic sensor, determining an attribute of a second ultrasonic signal oscillated by the ultrasonic sensor, based on the obtained first ultrasonic signal, oscillating a second ultrasonic signal having the determined attribute via the ultrasonic sensor, obtaining a third ultrasonic signal via the ultrasonic sensor, and obtaining fingerprint information based on the third ultrasonic signal and the attribute.

In an electronic device according to an embodiment, a computer-readable recording medium storing instructions, when executed by a processor of an electronic device, when the first ultrasonic signal of a preset value or less is obtained via the ultrasonic sensor, the determining of the attribute of the second ultrasonic signal oscillated by the ultrasonic sensor, based on the obtained first ultrasonic signal may include determining strength of a second ultrasonic signal oscillated by the ultrasonic sensor, based on strength of the first ultrasonic signal.

In an electronic device according to an embodiment, a computer-readable recording medium storing instructions, the determining of the attribute of the second ultrasonic signal may include determining at least one of strength of the second ultrasonic signal oscillated by the ultrasonic sensor, a frequency of the second ultrasonic signal, and a cycle at which the second ultrasonic signal is oscillated.

Figure 13:
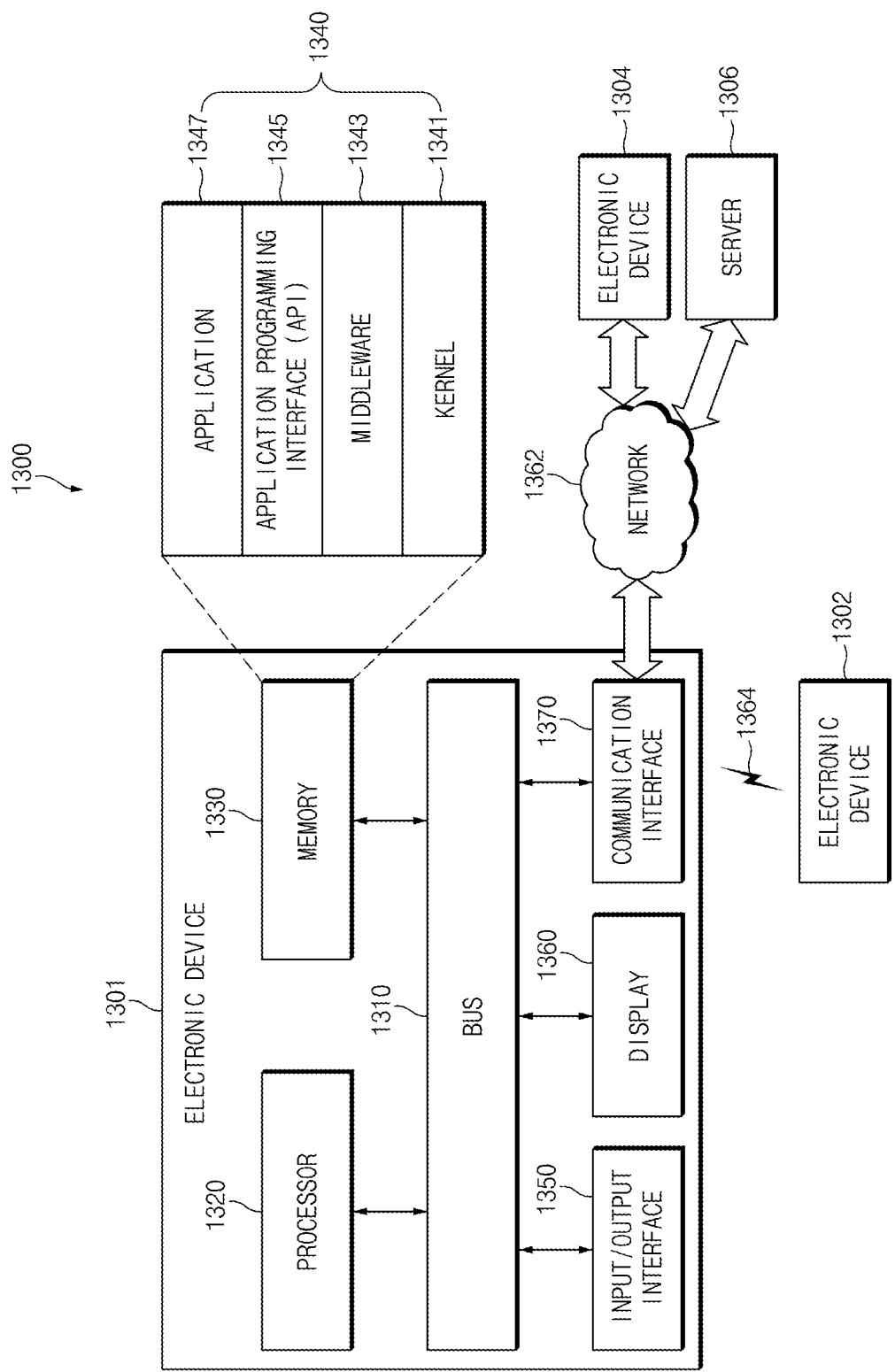
FIG. 13 illustrates an electronic device in a network environment, according to various embodiments.

FIG. 13 illustrates an electronic device in a network environment system, according to various embodiments.

Referring to FIG. 13, according to various embodiments, an electronic device 1301, a first electronic device 1302, a second electronic device 1304, or a server 1306 may be connected each other over a network 1362 or a short range communication 1364. The electronic device 1301 may include a bus 1310, a processor 1320, a memory 1330, an input/output interface 1350, a display 1360, and a communication interface 1370. According to an embodiment, the electronic device 1301 may not include at least one of the above-described components or may further include other component(s).

For example, the bus 1310 may interconnect the above-described components 1310 to 1370 and may include a circuit for conveying communications (e.g., a control message and/or data) among the above-described components.

The processor 1320 may include one or more of a central processing unit (CPU), an application processor (AP), or a communication processor (CP). For example, the processor 1320 may perform an arithmetic operation or data processing associated with control and/or communication of at least other components of the electronic device 1301.

The memory 1330 may include a volatile and/or nonvolatile memory. For example, the memory 1330 may store commands or data associated with at least one other component(s) of the electronic device 1301. According to an embodiment, the memory 1330 may store software and/or a program 1340. The program 1340 may include, for example, a kernel 1341, a middleware 1343, an application programming interface (API) 1345, and/or an application program (or "an application") 1347. At least a part of the kernel 1341, the middleware 1343, or the API 1345 may be referred to as an "operating system (OS)".

For example, the kernel 1341 may control or manage system resources (e.g., the bus 1310, the processor 1320, the memory 1330, and the like) that are used to execute operations or functions of other programs (e.g., the middleware 1343, the API 1345, and the application program 1347). Furthermore, the kernel 1341 may provide an interface that allows the middleware 1343, the API 1345, or the application program 1347 to access discrete components of the electronic device 1301 so as to control or manage system resources.

The middleware 1343 may perform, for example, a mediation role such that the API 1345 or the application program 1347 communicates with the kernel 1341 to exchange data.

Furthermore, the middleware 1343 may process task requests received from the application program 1347 according to a priority. For example, the middleware 1343 may assign the priority, which makes it possible to use a system resource (e.g., the bus 1310, the processor 1320, the memory 1330, or the like) of the electronic device 1301, to at least one of the application program 1347. For example, the middleware 1343 may process the one or more task requests according to the priority assigned to the at least one, which makes it possible to perform scheduling or load balancing on the one or more task requests.

The API 1345 may be, for example, an interface through which the application program 1347 controls a function provided by the kernel 1341 or the middleware 1343, and may include, for example, at least one interface or function (e.g., an instruction) for a file control, a window control, image processing, a character control, or the like.

The input/output interface 1350 may play a role, for example, of an interface which transmits a command or data input from a user or another external device, to other component(s) of the electronic device 1301. Furthermore, the input/output interface 1350 may output a command or data, received from other component(s) of the electronic device 1301, to a user or another external device.

The display 1360 may include, for example, a liquid crystal display (LCD), a light-emitting diode (LED) display, an organic LED (OLED) display, a microelectromechanical systems (MEMS) display, or an electronic paper display. The display 1360 may display, for example, various contents (e.g., a text, an image, a video, an icon, a symbol, and the like) to a user. The display 1360 may include a touch screen and may receive, for example, a touch, gesture, proximity, or hovering input using an electronic pen or a part of a user's body.

For example, the communication interface 1370 may establish communication between the electronic device 1301 and an external device (e.g., the first electronic device 1302, the second electronic device 1304, or the server 1306). For example, the communication interface 1370 may be connected to the network 1362 over wireless communication or wired communication to communicate with the external device (e.g., the second electronic device 1304 or the server 1306).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1364. The short range communication 1364 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1301 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1362 may include at least one of telecommunications networks, for example, a computer network (e.g., LAN or WAN), an Internet, or a telephone network.

Each of the first and second electronic devices 1302 and 1304 may be a device of which the type is different from or the same as that of the electronic device 1301. According to an embodiment, the server 1306 may include a group of one or more servers. According to various embodiments, all or a portion of operations that the electronic device 1301 will perform may be executed by another or plural electronic devices (e.g., the first electronic device 1302, the second electronic device 1304 or the server 1306). According to an embodiment, in the case where the electronic device 1301 executes any function or service automatically or in response to a request, the electronic device 1301 may not perform the function or the service internally, but, alternatively additionally, it may request at least a portion of a function associated with the electronic device 1301 from another device (e.g., the electronic device 1302 or 1304 or the server 1306). The other electronic device may execute the requested function or additional function and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Figure 14:
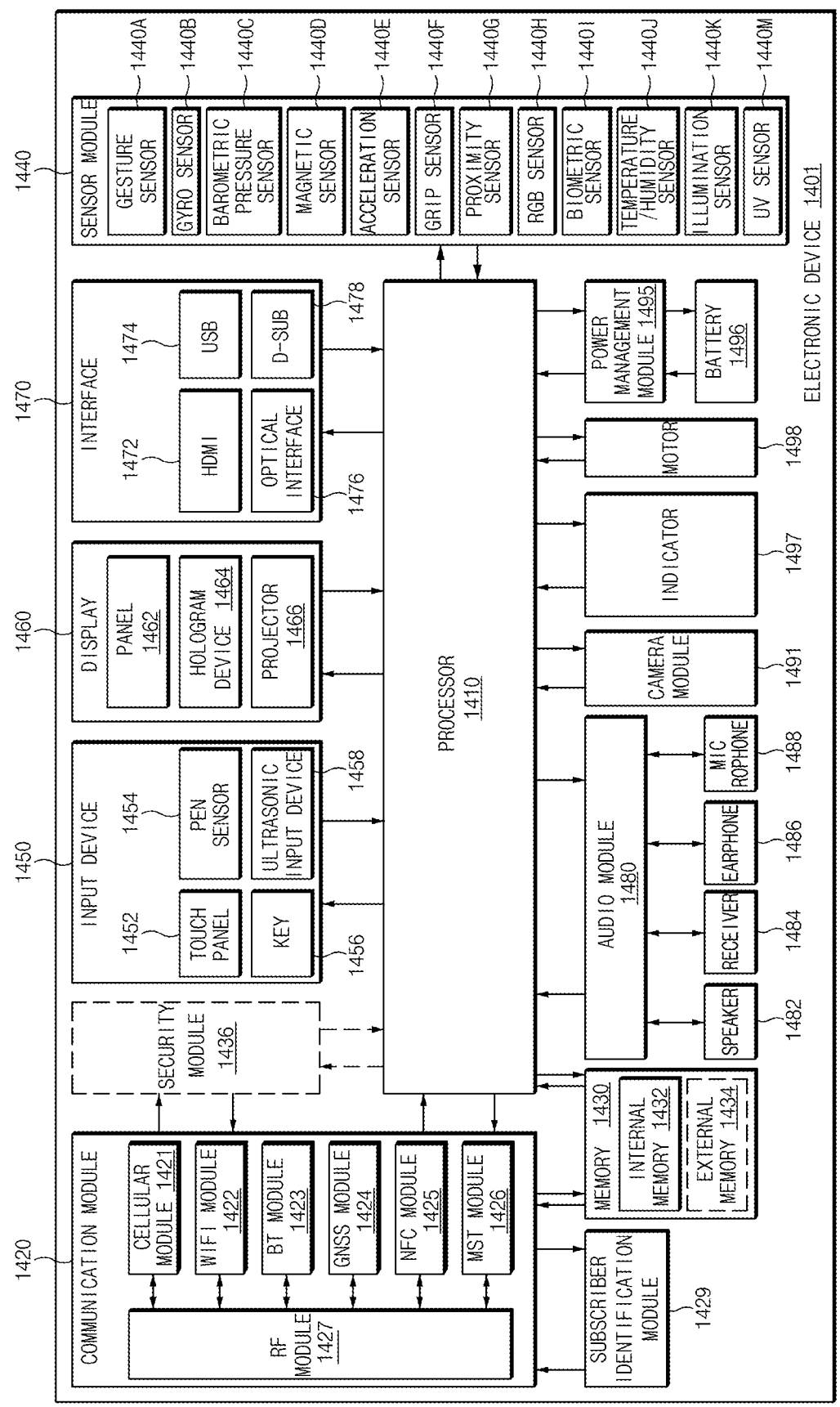
FIG. 14 illustrates a block diagram of the electronic device, according to various embodiments.

FIG. 14 illustrates a block diagram of an electronic device, according to various embodiments.

Referring to FIG. 14, an electronic device 1401 may include, for example, all or a part of the electronic device 1301 illustrated in FIG. 13. The electronic device 1401 may include one or more processors (e.g., an application processor (AP)) 1410, a communication module 1420, a subscriber identification module 1429, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may drive, for example, an operating system (OS) or an application to control a plurality of hardware or software components connected to the processor 1410 and may process and compute a variety of data. For example, the processor 1410 may be implemented with a System on Chip (SoC). According to an embodiment, the processor 1410 may further include a graphic processing unit (GPU) and/or an image signal processor. The processor 1410 may include at least a part (e.g., a cellular module 1421) of components illustrated in FIG. 14. The processor 1410 may load a command or data, which is received from at least one of other components (e.g., a nonvolatile memory), into a volatile memory and process the loaded command or data. The processor 1410 may store a variety of data in the nonvolatile memory.

The communication module 1420 may be configured the same as or similar to the communication interface 1370 of FIG. 13. The communication module 1420 may include the cellular module 1421, a Wi-Fi module 1422, a Bluetooth (BT) module 1423, a GNSS module 1424 (e.g., a GPS module, a Glonass module, a Beidou module, or a Galileo module), a near field communication (NFC) module 1425, a MST module 1426 and a radio frequency (RF) module 1427.

The cellular module 1421 may provide, for example, voice communication, video communication, a character service, an Internet service, or the like over a communication network. According to an embodiment, the cellular module 1421 may perform discrimination and authentication of the electronic device 1401 within a communication network by using the subscriber identification module (e.g., a SIM card) 1429. According to an embodiment, the cellular module 1421 may perform at least a portion of functions that the processor 1410 provides. According to an embodiment, the cellular module 1421 may include a communication processor (CP).

Each of the Wi-Fi module 1422, the BT module 1423, the GNSS module 1424, the NFC module 1425, or the MST module 1426 may include a processor for processing data exchanged through a corresponding module, for example. According to an embodiment, at least a part (e.g., two or more) of the cellular module 1421, the Wi-Fi module 1422, the BT module 1423, the GNSS module 1424, the NFC module 1425, or the MST module 1426 may be included within one Integrated Circuit (IC) or an IC package.

For example, the RF module 1427 may transmit and receive a communication signal (e.g., an RF signal). For example, the RF module 1427 may include a transceiver, a power amplifier module (PAM), a frequency filter, a low noise amplifier (LNA), an antenna, or the like. According to another embodiment, at least one of the cellular module 1421, the Wi-Fi module 1422, the BT module 1423, the GNSS module 1424, the NFC module 1425, or the MST module 1426 may transmit and receive an RF signal through a separate RF module.

The subscriber identification module 1429 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1430 (e.g., the memory 1330) may include an internal memory 1432 or an external memory 1434. For example, the internal memory 1432 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1434 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1434 may be operatively and/or physically connected to the electronic device 1401 through various interfaces.

A security module 1436 may be a module that includes a storage space of which a security level is higher than that of the memory 1430 and may be a circuit that guarantees safe data storage and a protected execution environment. The security module 1436 may be implemented with a separate circuit and may include a separate processor. For example, the security module 1436 may be in a smart chip or a secure digital (SD) card, which is removable, or may include an embedded secure element (eSE) embedded in a fixed chip of the electronic device 1401. Furthermore, the security module 1436 may operate based on an operating system (OS) that is different from the OS of the electronic device 1401. For example, the security module 1436 may operate based on java card open platform (JCOP) OS.

The sensor module 1440 may measure, for example, a physical quantity or may detect an operation state of the electronic device 1401. The sensor module 1440 may convert the measured or detected information to an electric signal. For example, the sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, the proximity sensor 1440G, a color sensor 1440H (e.g., red, green, blue (RGB) sensor), a biometric sensor 1440I, a temperature/humidity sensor 1440J, an illuminance sensor 1440K, or an UV sensor 1440M. Although not illustrated, additionally or alternatively, the sensor module 1440 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one or more sensors included therein. According to an embodiment, the electronic device 1401 may further include a processor that is a part of the processor 1410 or independent of the processor 1410 and is configured to control the sensor module 1440. The processor may control the sensor module 1440 while the processor 1410 remains at a sleep state.

The input device 1450 may include, for example, a touch panel 1452, a (digital) pen sensor 1454, a key 1456, or an ultrasonic input unit 1458. For example, the touch panel 1452 may use at least one of capacitive, resistive, infrared and ultrasonic detecting methods. Also, the touch panel 1452 may further include a control circuit. The touch panel 1452 may further include a tactile layer to provide a tactile reaction to a user.

The (digital) pen sensor 1454 may be, for example, a part of a touch panel or may include an additional sheet for recognition. The key 1456 may include, for example, a physical button, an optical key, a keypad, or the like. The ultrasonic input device 1458 may detect (or sense) an ultrasonic signal, which is generated from an input device, through a microphone (e.g., a microphone 1488) and may check data corresponding to the detected ultrasonic signal.

The display 1460 (e.g., the display 1360) may include a panel 1462, a hologram device 1464, or a projector 1466. The panel 1462 may be the same as or similar to the display 1360 illustrated in FIG. 13. The panel 1462 may be implemented, for example, to be flexible, transparent or wearable. The panel 1462 and the touch panel 1452 may be integrated into a single module. The hologram device 1464 may display a stereoscopic image in a space using a light interference phenomenon. The projector 1466 may project light onto a screen so as to display an image. For example, the screen may be arranged in the inside or the outside of the electronic device 1401. According to an embodiment, the display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature (D-sub) 1478. The interface 1470 may be included, for example, in the communication interface 1370 illustrated in FIG. 13. Additionally or alternatively, the interface 1470 may include, for example, a mobile high definition link (MHL) interface, a SD card/multi-media card (MMC) interface, or an infrared data association (IrDA) standard interface.

The audio module 1480 may convert a sound and an electric signal in dual directions. At least a component of the audio module 1480 may be included, for example, in the input/output interface 1350 illustrated in FIG. 13. The audio module 1480 may process, for example, sound information that is input or output through a speaker 1482, a receiver 1484, an earphone 1486, or the microphone 1488.

For example, the camera module 1491 may shoot a still image or a video. According to an embodiment, the camera module 1491 may include at least one or more image sensors (e.g., a front sensor or a rear sensor), a lens, an image signal processor (ISP), or a flash (e.g., an LED or a xenon lamp).

The power management module 1495 may manage, for example, power of the electronic device 1401. According to an embodiment, a power management integrated circuit (PMIC), a charger IC, or a battery or fuel gauge may be included in the power management module 1495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, and the like. The motor 1498 may convert an electrical signal into a mechanical vibration and may generate the following effects: vibration, haptic, and the like. Although not illustrated, a processing device (e.g., a GPU) for supporting a mobile TV may be included in the electronic device 1401. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 15:
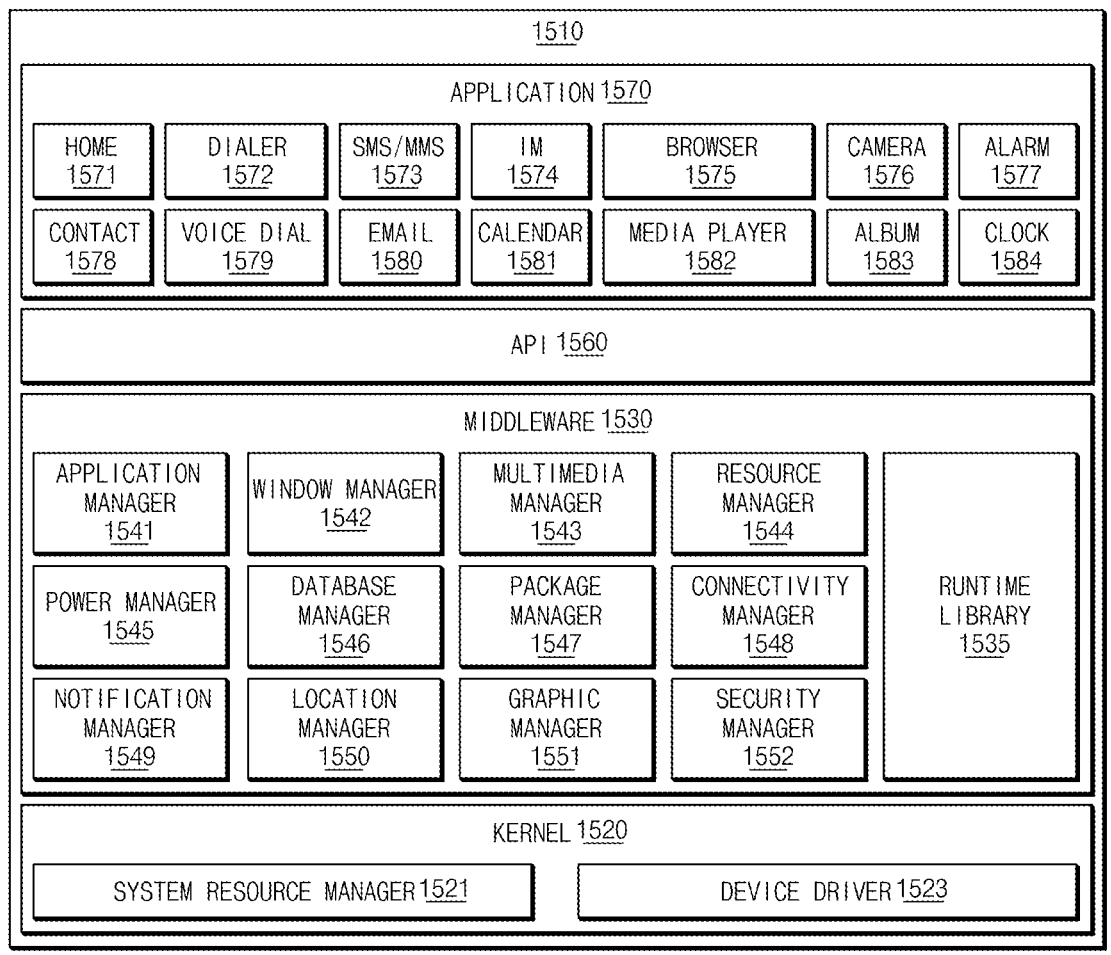
FIG. 15 is a block diagram of a program module, according to various embodiments.

FIG. 15 illustrates a block diagram of a program module, according to various embodiments.

According to an embodiment, a program module 1510 (e.g., the program 1340) may include an operating system (OS) to control resources associated with an electronic device (e.g., the electronic device 1301), and/or diverse applications (e.g., the application program 1347) driven on the OS. The OS may be, for example, Android, iOS, Windows, Symbian, or Tizen.

The program module 1510 may include a kernel 1520, a middleware 1530, an application programming interface (API) 1560, and/or an application 1570. At least a portion of the program module 1510 may be preloaded on an electronic device or may be downloadable from an external electronic device (e.g., the first electronic device 1302, the second electronic device 1304, the server 1306, or the like).

The kernel 1520 (e.g., the kernel 1341) may include, for example, a system resource manager 1521 or a device driver 1523. The system resource manager 1521 may perform control, allocation, or retrieval of system resources. According to an embodiment, the system resource manager 1521 may include a process managing unit, a memory managing unit, or a file system managing unit. The device driver 1523 may include, for example, a display driver, a camera driver, a Bluetooth driver, a shared memory driver, a USB driver, a keypad driver, a Wi-Fi driver, an audio driver, or an interprocess communication (IPC) driver.

The middleware 1530 may provide, for example, a function that the application 1570 needs in common, or may provide diverse functions to the application 1570 through the API 1560 to allow the application 1570 to efficiently use limited system resources of the electronic device. According to an embodiment, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, a security manager 1552, or a payment manager 1554.

The runtime library 1535 may include, for example, a library module that is used by a compiler to add a new function through a programming language while the application 1570 is being executed. The runtime library 1535 may perform input/output management, memory management, or capacities about arithmetic functions.

The application manager 1541 may manage, for example, a life cycle of at least one application of the application 1570. The window manager 1542 may manage a graphic user interface (GUI) resource that is used in a screen. The multimedia manager 1543 may identify a format necessary for playing diverse media files, and may perform encoding or decoding of media files by using a codec suitable for the format. The resource manager 1544 may manage resources such as a storage space, memory, or source code of at least one application of the application 1570.

The power manager 1545 may operate, for example, with a basic input/output system (BIOS) to manage capacity or temperature of a battery or power, and may provide power information for an operation of an electronic device by using the corresponding information. The database manager 1546 may generate, search for, or modify database that is to be used in at least one application of the application 1570. The package manager 1547 may install or update an application that is distributed in the form of package file.

The connectivity manager 1548 may manage, for example, wireless connection such as Wi-Fi or Bluetooth. The notification manager 1549 may display or notify an event such as arrival message, appointment, or proximity notification in a mode that does not disturb a user. The location manager 1550 may manage location information about an electronic device. The graphic manager 1551 may manage a graphic effect that is provided to a user, or manage a user interface relevant thereto. The security manager 1552 may provide a general security function necessary for system security, user authentication, or the like. According to an embodiment, in the case where an electronic device (e.g., the electronic device 1301) includes a telephony function, the middleware 1530 may further include a telephony manager for managing a voice or video call function of the electronic device.

The middleware 1530 may include a middleware module that combines diverse functions of the above-described components. The middleware 1530 may provide a module specialized to each OS kind to provide differentiated functions. Additionally, the middleware 1530 may dynamically remove a part of the preexisting components or may add new components thereto.

The API 1560 (e.g., the API 1345) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1570 (e.g., the application program 1347) may include, for example, one or more applications capable of providing functions for a home 1571, a dialer 1572, an SMS/MMS 1573, an instant message (IM) 1574, a browser 1575, a camera 1576, an alarm 1577, a contact 1578, a voice dial 1579, an e-mail 1580, a calendar 1581, a media player 1582, an album 1583, and a timepiece 1584, or for offering health care (e.g., measuring an exercise quantity, blood sugar, or the like) or environment information (e.g., information of barometric pressure, humidity, temperature, or the like).

According to an embodiment, the application 1570 may include an application (hereinafter referred to as "information exchanging application" for descriptive convenience) to support information exchange between an electronic device (e.g., the electronic device 1301) and an external electronic device (e.g., the first electronic device 1302 or the second electronic device 1304). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1570 may include an application (e.g., a health care application of a mobile medical device) that is assigned in accordance with an attribute of an external electronic device. According to an embodiment, the application 1570 may include an application that is received from an external electronic device (e.g., the first electronic device 1302, the second electronic device 1304, or the server 1306). According to an embodiment, the application 1570 may include a preloaded application or a third party application that is downloadable from a server. The names of components of the program module 1510 according to the embodiment may be modifiable depending on kinds of operating systems.

According to various embodiments, at least a portion of the program module 1510 may be implemented by software, firmware, hardware, or a combination of two or more thereof. At least a portion of the program module 1510 may be implemented (e.g., executed), for example, by the processor (e.g., the processor 1410). At least a portion of the program module 1510 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1320), may cause the one or more processors to perform a function corresponding to the instruction. The computer-readable storage media, for example, may be the memory 1330.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
    an ultrasonic sensor; and
    a processor electrically connected to the ultrasonic sensor, wherein the processor is configured to:
        obtain a noise signal at a periphery of the electronic device, via the ultrasonic sensor;
        determine an attribute of a first ultrasonic signal oscillated by the ultrasonic sensor, based on the obtained noise signal; and
        obtain fingerprint information based on a second ultrasonic signal obtained via the ultrasonic sensor and the determined attribute,
    wherein the ultrasonic sensor periodically oscillates the first ultrasonic signal in a form of a square wave pulse, and
    wherein the processor is further configured to determine at least one of a width of the square wave pulse, an amplitude of the square wave pulse, and a cycle of the square wave pulse, based on the noise signal.

2. The electronic device of claim 1, wherein the processor is configured to:
    when the noise signal of a strength of a preset value or more is obtained, determine strength of a first ultrasonic signal oscillated by the ultrasonic sensor, based on the strength of the noise signal.

3. The electronic device of claim 2, wherein the processor is configured to:
    determine a threshold value based on the determined strength of the first ultrasonic signal; and
    obtain the fingerprint information, based on a second ultrasonic signal obtained with strength of the determined threshold value or more.

4. The electronic device of claim 1, wherein the processor is configured to:
    determine a frequency of the first ultrasonic signal such that the frequency of the first ultrasonic signal oscillated by the ultrasonic sensor is different from a frequency of the noise signal by a preset band or more.

5. The electronic device of claim 1, wherein the processor is configured to:
    determine a frequency of the first ultrasonic signal such that the frequency of the first ultrasonic signal oscillated by the ultrasonic sensor is changed with time within a preset frequency range; and
    obtain the fingerprint information based on the second ultrasonic signal corresponding to the first ultrasonic signal oscillated with the changed frequency.

6. The electronic device of claim 5, wherein the processor is configured to:
    determine the frequency of the first ultrasonic signal such that the frequency of the first ultrasonic signal oscillated by the ultrasonic sensor is changed with time within a frequency range other than a frequency range including a frequency of the noise signal within the preset frequency range.

7. The electronic device of claim 5, wherein the processor is configured to:
    obtain the fingerprint information based on a second ultrasonic signal other than the second ultrasonic signal corresponding to the first ultrasonic signal oscillated with the frequency of the noise signal among the second ultrasonic signal corresponding to the first ultrasonic signal oscillated with the changed frequency.

8. The electronic device of claim 1, further comprising:
    a display electrically connected to the processor,
    wherein the ultrasonic sensor includes an oscillation unit oscillating the first ultrasonic signal and a receiving unit obtaining the second ultrasonic signal,
    wherein the oscillation unit vibrates the display in a first area of the display to oscillate the first ultrasonic signal, and
    wherein the receiving unit obtains the second ultrasonic signal in at least a partial area in a second area other than the first area of the display.

9. The electronic device of claim 1, further comprising:
    a temperature sensor configured to measure temperature at a periphery of the electronic device,
    wherein the processor is configured to:
        determine an attribute of the first ultrasonic signal, further using temperature obtained via the temperature sensor.

10. An electronic device comprising:
    a display;
    an ultrasonic sensor positioned on a rear surface of the display and configured to obtain an ultrasonic signal in at least a partial area of the display; and
    a processor electrically connected to the display and the ultrasonic sensor, wherein the processor is configured to:
        oscillate a first ultrasonic signal via the ultrasonic sensor;
        obtain a second ultrasonic signal corresponding to the first ultrasonic signal via the ultrasonic sensor;
        determine an attribute of a third ultrasonic signal oscillated by the ultrasonic sensor, based on the obtained second ultrasonic signal;

oscillate the third ultrasonic signal via the ultrasonic sensor; and obtain fingerprint information via the ultrasonic sensor based on a fourth ultrasonic signal corresponding to the third ultrasonic signal and the determined attribute, wherein the ultrasonic sensor periodically oscillates the first ultrasonic signal in a form of a square wave pulse, and wherein the processor is further configured to determine at least one of a width of the square wave pulse, an amplitude of the square wave pulse, and a cycle of the square wave pulse, based on a noise signal.

11. The electronic device of claim 10, wherein the processor is configured to:

obtain fingerprint information based on a fourth ultrasonic signal of a threshold value or more; and set a threshold value of the fourth ultrasonic signal obtained in an area, in which the second ultrasonic signal less than a preset threshold value is obtained, in an area of the display to a value less than the preset threshold value.

12. The electronic device of claim 10, wherein the processor is configured to:

when the second ultrasonic signal of a preset value or less is obtained in at least the partial area of the display, determine strength of the first ultrasonic signal oscillated by the ultrasonic sensor, based on strength of the second ultrasonic signal.

13. The electronic device of claim 12, wherein the processor is configured to:

when the second ultrasonic signal of the preset value or less is obtained in at least the partial area of the display, display a message indicating that it is impossible to obtain the fingerprint information, in the display.

14. The electronic device of claim 10, wherein the processor is configured to:

when the second ultrasonic signal of a preset value or less is obtained in at least the partial area of the display, display a guide UI for inducing a fingerprint input in an area of the display in which the second ultrasonic signal of more than the preset value is obtained.

* * * * *